United States Patent
Hafeez et al.

(10) Patent No.: US 12,225,621 B2
(45) Date of Patent: Feb. 11, 2025

(54) SPECTRUM USAGE PROTECTION IN A SHARED WIRELESS NETWORK

(71) Applicant: Charter Communications Operating, LLC, St. Louis, MO (US)

(72) Inventors: Abdulrauf Hafeez, Cary, NC (US); Maulik V. Vaidya, Escondido, CA (US)

(73) Assignee: Charter Communications Operating, LLC, St. Louis, MO (US)

( * ) Notice: Subject to any disclaimer, the term of this patent is extended or adjusted under 35 U.S.C. 154(b) by 0 days.

(21) Appl. No.: 18/211,606

(22) Filed: Jun. 20, 2023

(65) Prior Publication Data
US 2023/0337324 A1    Oct. 19, 2023

Related U.S. Application Data

(63) Continuation of application No. 17/168,681, filed on Feb. 5, 2021, now Pat. No. 11,751,280.

(51) Int. Cl.
| | |
|---|---|
| *H04W 76/36* | (2018.01) |
| *H04W 28/086* | (2023.01) |
| *H04W 28/20* | (2009.01) |
| *H04W 36/04* | (2009.01) |
| *H04W 36/22* | (2009.01) |
| *H04W 36/38* | (2009.01) |
| *H04W 48/06* | (2009.01) |
| *H04W 72/566* | (2023.01) |
| *H04W 76/22* | (2018.01) |

(52) U.S. Cl.
CPC ....... *H04W 76/36* (2018.02); *H04W 28/0864* (2023.05); *H04W 28/20* (2013.01); *H04W 36/04* (2013.01); *H04W 36/22* (2013.01); *H04W 36/385* (2013.01); *H04W 48/06* (2013.01); *H04W 72/566* (2023.01); *H04W 76/22* (2018.02)

(58) Field of Classification Search
None
See application file for complete search history.

(56) References Cited

U.S. PATENT DOCUMENTS

| | | |
|---|---|---|
| 2015/0373554 A1 | 12/2015 | Freda et al. |
| 2018/0063754 A1* | 3/2018 | Wang ............... H04W 24/10 |
| 2019/0021090 A1 | 1/2019 | Do |
| 2019/0103952 A1* | 4/2019 | Goudal ............. H04B 7/18508 |
| 2020/0037392 A1* | 1/2020 | Qui .................. H04W 76/34 |

* cited by examiner

*Primary Examiner* — Anez C Ebrahim
(74) *Attorney, Agent, or Firm* — Armis IP Law, LLC

(57) ABSTRACT

According to one configuration, multiple users in a tiered hierarchy share use of a wireless spectrum. For example, a spectrum access system receives a notification indicating that a first-priority tier 1 user in the hierarchy temporarily needs access to a first wireless spectrum assigned to a second-priority tier 2 user in the hierarchy. In response to the notification, the spectrum access system temporarily allocates the second-priority tier 2 user use of a second wireless spectrum. The spectrum access system protects use of the second wireless spectrum by the second-priority tier 2 user from a third-priority tier 3 user in the hierarchy. In certain instances, the one or more spectrum access systems receive the same notification of use of the first wireless spectrum by the first-priority tier 1 user. The multiple spectrum access systems not serving the second-priority tier 2 user protect the Tier 2 User from any Tier 3 Users in the hierarchy.

37 Claims, 11 Drawing Sheets

SPECTRUM USAGE PROTECTION IN A SHARED WIRELESS NETWORK

RELATED APPLICATION

This application is a continuation application of earlier filed U.S. patent application Ser. No. 17/168,681 entitled "SPECTRUM USAGE PROTECTION IN A SHARED WIRELESS NETWORK," filed on Feb. 5, 2021, the entire teachings of which are incorporated herein by this reference.

BACKGROUND

Conventional wireless networks typically include one or more wireless base stations to provide mobile communication devices access to a remote network such as the Internet.

One type of wireless base station is a so-called CBSD (Citizen Broadband Radio Service Device). Such a device uses a wireless channel allocated from a CBRS (Citizens Band Radio Service) band to support communications with one or more mobile communication devices.

Typically, so-called SAS (Spectrum Access Service) in a CBRS network allocates one or more wireless channels to a CBSD (such as a wireless base station) to support communications with respective user equipment such as one or more mobile communication devices. Each base station can be configured to communicate with the SAS to receive notification of the one or more wireless channels allocated for its use. Controlled allocation of wireless channels by the spectrum access system helps to prevent interference by wireless stations sharing use of the same spectrum.

There are multiple different types of wireless channels in a conventional CBRS band. For example, portions of spectrum in a CBRS band include so-called Priority Access License (PAL) wireless channels, General Authorized Access (GAA) wireless channels, or a combination of both.

In general, PAL wireless channels are licensed wireless channels in which a corresponding licensee (such as an entity paying for use of the wireless channel) is provided some protection of use. For example, when no incumbent user requires use of the channels, in theory, the licenses entity is able to freely use the PAL wireless channels in respective one or more predetermined geographical regions without interference by other users (such as lower priority GAA users).

Subsequent to allocation of one or more wireless channels, the wireless base stations use the allocated spectrum to provide one or more communication devices access to a remote network such as the Internet.

BRIEF DESCRIPTION OF EMBODIMENTS

There are deficiencies associated with conventional techniques of providing wireless services to mobile communication devices. For example, conventional techniques do not provide a way to protect licensed users from wireless interference during an event in which a primary wireless channel allocated for use by a wireless network service provider is no longer available.

Embodiments herein provide improved use of wireless spectrum, promoting fairness amongst licensed and unlicensed wireless network service providers.

For example, a wireless system is shared amongst a hierarchal tier of users. An allocation management resource (such as one or more spectrum access systems) receive a notification indicating that a first-priority tier 1 user in the hierarchy temporarily needs access to a first wireless spectrum currently assigned to a second-priority tier 2 user in the hierarchy. In response to the notification, the allocation management resource temporarily allocates the second-priority tier 2 user use of a second wireless spectrum while the first-priority tier 1 user uses the first wireless spectrum. The allocation management resource protects the use of the second wireless spectrum by the second-priority tier 2 user from a third-priority tier 3 user in the hierarchy.

In further example embodiments, in response to receiving notification that the first-priority tier 1 user temporarily needs access to (such as currently accesses or use) the first spectrum assigned to the second-priority tier 2 User, the allocation management resource temporarily allocates third spectrum to the third-priority tier 3 user, the third spectrum being unassigned spectrum prior to the trigger event of the incumbent user using the first wireless spectrum.

Further embodiments herein include, in response to receiving the notification and non-availability of unassigned spectrum for the second priority tier-2 user, the allocation management resource: i) deallocates the second wireless spectrum from the third-priority tier 3 user, ii) allocates the second wireless spectrum to the second-priority tier 2 user, and iii) allocates a third wireless spectrum to the third-priority tier 3 user, the third spectrum being an unassigned spectrum.

In further example embodiments, in response to receiving the notification and non-availability of unassigned wireless spectrum for the third-priority tier 3 user, the allocation management resource modifies a wireless spectrum grant for the third-priority tier 3 user.

Additionally or alternatively, in response to receiving notification that the first-priority tier 1 user no longer requires or needs use of the first wireless spectrum, the allocation management resource allocates the first wireless spectrum to the second-priority tier 2 user.

In still further example embodiments, in response to receiving notification that the first-priority tier 1 user no longer needs access to the first wireless spectrum, the allocation management resource (such as communication management resource or one or more spectrum access systems) allocates ting the second wireless spectrum to the third-priority tier 3 user; or the allocation management resource provides continued allocation of the third wireless spectrum to the third-priority tier 3 user.

In yet further example embodiments, in response to receiving notification that the first-priority tier 1 user no longer needs access to the first wireless spectrum, the allocation management resource restores third-priority tier 3 user spectrum grants that had been cancelled or modified as a result of the first-priority tier 1 user using (revoking use of) the first wireless spectrum.

Further embodiments herein include, via allocation management resource, receiving notification that the first-priority tier 1 user temporarily needs access to wireless spectrum assigned for use to the second-priority tier 2 user in a Pal Protection Area. In response to receiving this notification, the allocation management resource allocates all second-priority tier 2 users in the PAL Protection Area temporarily to other spectrum in the band (available wireless spectrum such as in a CBRS band or other wireless band) while protecting their operation from any third-priority tier 3 users.

In yet further example embodiments, in response to receiving notification that a first-priority tier 1 user temporarily needs access to spectrum assigned to a second-priority tier 2 user in a PAL Protection Area, the allocation management resource re-assigns only the second-priority tier 2 users in the PAL Protection Area affected by the first-priority tier 1 user temporarily to other wireless spectrum to protect the second-priority tier 2 user from third-priority tier 3 users.

In one embodiment, temporary spectrum assignments for the second-priority tier 2 users are pre-determined and are consistent across one or more allocation management resources (such as spectrum access systems) providing wireless allocation services in a service area.

Further embodiments herein include, via the allocation management resource, implementing temporary spectrum assignments for second-priority tier 2 users, which are mapped via at least one many-to-1 mapping based on knowledge about use of spectrum by a first-priority tier 1 user.

In one embodiment, via multiple spectrum access systems, in response to receiving notification that a first-priority tier 1 user temporarily needs access to spectrum assigned to a second-priority tier 2 user not served by the spectrum access system(s), the allocation management resource (such as one or more spectrum access systems) provide protection to the second-priority tier 2 user in accordance with pre-determined temporary spectrum assignments (such as biometric information allocation information) implemented by the multiple spectrum access systems.

In one embodiment, via the allocation management resource or other suitable entity, protecting the second-priority tier 2 user from one or more third-priority tier 3 users includes reducing a power transmit level of devices operated by the third-priority tier 3 users communicating via the second wireless spectrum.

In still further example embodiments, in response to receiving notification that the first-priority tier 1 user temporarily needs access to wireless spectrum allocated to some devices of a second-priority tier 2 user in a PAL Protection Area, allocating all second-priority tier 2 user devices in the PAL Protection Area temporarily to other wireless spectrum in an available band while protecting their operation from any third-priority tier 3 users.

In yet further example embodiments, in response to receiving notification that a first-priority tier 1 user temporarily needs access to wireless spectrum allocated to some devices of a second-priority tier 2 user in a PAL Protection Area, re-assigning only the second-priority tier 2 user devices in the PAL Protection Area affected by the first-priority tier 1 user temporarily to other wireless spectrum while protecting the second-priority tier 2 user devices from third-priority tier 3 users.

In further example embodiments, temporary spectrum assignments for second-priority tier 2 users are pre-determined and are consistent across multiple spectrum access systems providing spectrum allocation service in a service area. Further embodiments herein include, via the allocation management resource or other suitable entity, implementing temporary spectrum assignments for second-priority tier 2 users, which are mapped via at least one many-to-1 mapping based on knowledge about use of wireless spectrum by first-priority tier 1 users.

In still further example embodiments, the allocation management resource notifies one or more second second-priority tier 2 users in the wireless system about temporary spectrum assignments (such as backup assignment information) in advance of implementing a reallocation. In one embodiment, the second-priority tier 2 users configure their user equipment (such as wireless stations) for appropriate bandwidth parts to use for switching between the primary and temporary spectrum assignments.

In accordance with further example embodiments, communication management hardware receives notification of primary spectrum allocation information and backup spectrum allocation information. Initially, during a first mode, the communication management hardware implements the primary spectrum allocation information via allocation of first wireless spectrum to a first wireless station and second wireless spectrum to a second wireless station in a network environment.

In response to detecting a trigger event in which the first wireless spectrum is no longer available for use, the communication management hardware operates in a backup mode and implements the backup spectrum allocation information as substitute to the first spectrum allocation information. In one embodiment, the backup allocation management information indicates allocation of the second spectrum for use by the first wireless base station. As indicated by the backup allocation information, in response to the trigger event, the communication management hardware allocates use of the second wireless spectrum to the first wireless station as a substitute to the first wireless spectrum. Thus, when the first wireless spectrum is unavailable, the first wireless station is allocated use of the backup wireless spectrum, protecting fair use of the first wireless spectrum by the first wireless station.

Implementation of the backup spectrum allocation information in response to the trigger event can be achieved in any number of ways. For example, the communication management hardware can be configured to include first communication management hardware and second communication management hardware (such as allocation management hardware or multiple spectrum access systems). In one embodiment, the first spectrum allocation management hardware controls operation of the first wireless station (such as operated by a first wireless network service provider) and the second communication management hardware controls operation of the second wireless station (such as operated by a second wireless network service provider).

In one embodiment, in response to occurrence of the trigger event, the first communication management hardware transmits first communications to the first wireless station; the first communications notify the first wireless station to use the second wireless spectrum to wirelessly communicate from the first wireless station. In response to the trigger event, the second communication management hardware transmits second communications to the second wireless station; the second communications notify the second wireless station to adjust usage (such as lower wireless power levels or discontinue) use of the second wireless spectrum to wirelessly transmit messages, protecting use of the first wireless spectrum by the first wireless station and operator.

Further embodiments herein include, via the communication management hardware, in response to detecting the trigger event, and detecting that the first wireless station and the second wireless station are in a same geographical region, notifying the second wireless station to discontinue use of the second wireless spectrum to transmit communications in the network environment.

In certain instances, as previously discussed, it is not required that the second wireless base station discontinue use of the second wireless spectrum during the backup allocation mode. For example, in one embodiment, in response to detecting the trigger event, the communication management hardware can be configured to notify the second wireless station to reduce a wireless output power level of transmitting communications from the second wireless station over the second wireless spectrum. Reducing the respective wireless output power level of communicating with the second wireless spectrum reduces or eliminates interference associated with reallocated use of the second wireless spectrum by the first wireless station.

Thus, embodiments herein include, in response to detecting the trigger event, controlling use of the second wireless spectrum by the second wireless station to reduce wireless interference associated with the first wireless station using the second wireless spectrum.

In yet further example embodiments, the first wireless station is operated by a first wireless network service provider; the second wireless station is operated by a second wireless network service provider. The trigger event is notification of use of the first wireless spectrum by a spectrum user (entity such as an incumbent user) having higher priority rights than the first wireless network service provider operating the first wireless station. The first wireless network service provider has higher priority rights than the second wireless network service provider. In such an instance, during the backup mode, the incumbent entity receives allocation of the first wireless spectrum (revoked from the first wireless station and corresponding wireless network service provider); the first wireless station receives allocation of the second wireless spectrum (revoked from the second wireless station and corresponding wireless network service provider).

The wireless stations as discussed herein can be operated by any number of multiple different service providers. For example, as previously discussed, in one embodiment, the first wireless station is operated by a first wireless network service provider; the first wireless network service provider has a license to use the first wireless spectrum. In further example embodiments, the second wireless network service provider is an unlicensed spectrum user; the first wireless network service provider is a licensed spectrum user.

The wireless spectrum as discussed herein includes any number of one or more wireless channels. For example, in one embodiment, the first wireless spectrum includes a first wireless channel and a second wireless channel allocated for use by the first wireless station. The second wireless spectrum includes a third wireless channel and a fourth wireless channel allocated for use by the first wireless station as backup wireless channels. In one embodiment, via backup mapping information, the third wireless channel is a backup to the first wireless channel; the fourth wireless channel being a backup to the second wireless channel. Thus, embodiments herein include multiple-to-one mappings.

In still further example embodiments, implementation of the backup spectrum allocation information provides spectrum usage protection to a wireless network service provider granted a license to use the first wireless spectrum. In other words, if the first wireless spectrum becomes unavailable for use by the first wireless station operated by the first wireless network service provider, the first wireless station is allocated use of the second wireless spectrum (unassigned and available wireless spectrum).

In accordance with further example embodiments, the second wireless spectrum is a backup wireless channel for multiple wireless channels in the first spectrum allocation information.

Note further that the communication management hardware as discussed herein can be implemented in any suitable manner. For example, in one embodiment, the primary spectrum allocation information and the backup spectrum allocation information are distributed amongst multiple instances of spectrum allocation management resources (such as each implemented via hardware and/or software) in a network environment managing operation of the first wireless station and the second wireless station.

In still further example embodiments, the first wireless spectrum includes a first licensed wireless channel allocated from a tiered channel hierarchy in which a first wireless network service provider operating the first wireless station has a higher access priority to the second wireless spectrum than a second wireless network service provider operating the second wireless station.

Thus, embodiments herein provide novel ways of providing improved use of wireless channels and protection amongst different entities sharing use of spectrum in a wireless network environment.

Note that any of the resources as discussed herein can include one or more computerized devices, mobile communication devices, servers, base stations, wireless communication equipment, communication management systems, controllers, workstations, user equipment, handheld or laptop computers, or the like to carry out and/or support any or all of the method operations disclosed herein. In other words, one or more computerized devices or processors can be programmed and/or configured to operate as explained herein to carry out the different embodiments as described herein.

Yet other embodiments herein include software programs to perform the steps and operations summarized above and disclosed in detail below. One such embodiment comprises a computer program product including a non-transitory computer-readable storage medium (i.e., any computer readable hardware storage medium) on which software instructions are encoded for subsequent execution. The instructions, when executed in a computerized device (hardware) having a processor, program and/or cause the processor (hardware) to perform the operations disclosed herein. Such arrangements are typically provided as software, code, instructions, and/or other data (e.g., data structures) arranged or encoded on a non-transitory computer readable storage medium such as an optical medium (e.g., CD-ROM), floppy disk, hard disk, memory stick, memory device, etc., or other a medium such as firmware in one or more ROM, RAM, PROM, etc., or as an Application Specific Integrated Circuit (ASIC), etc. The software or firmware or other such configurations can be installed onto a computerized device to cause the computerized device to perform the techniques explained herein.

Accordingly, embodiments herein are directed to a method, system, computer program product, executable instructions, etc., that supports operations as discussed herein.

One embodiment includes a computer readable storage medium and/or system having instructions stored thereon to facilitate wireless communications in a network environment. The instructions, when executed by computer processor hardware, cause the computer processor hardware (such as one or more co-located or disparately processor devices) to: in a wireless system shared amongst a hierarchy of users: receive a notification indicating that a first-priority tier 1 user in the hierarchy temporarily needs access to a first wireless spectrum currently allocated to a second-priority tier 2 user in the hierarchy; in response to the notification, temporarily allocate the second-priority tier 2 user use of a second wireless spectrum; and protect the use of the second wireless spectrum by the second-priority tier 2 user from a third-priority tier 3 user in the hierarchy.

One embodiment includes a computer readable storage medium and/or system having instructions stored thereon to facilitate wireless communications in a network environment. The instructions, when executed by computer processor hardware, cause the computer processor hardware (such as one or more co-located or disparately processor devices) to: receive notification of primary spectrum allocation information and backup spectrum allocation information; implement the primary spectrum allocation information in which first wireless spectrum is allocated to a first wireless station and second wireless spectrum is allocated to a second wireless station in a network environment; and in response to detecting a trigger event in which the first wireless spectrum is no longer available for use: implement the backup spectrum allocation information in which the second wireless spectrum is allocated to the first wireless station as a substitute to the first wireless spectrum.

The ordering of the steps above has been added for clarity sake. Note that any of the processing steps as discussed herein can be performed in any suitable order.

Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor (hardware or software), or within an operating system or a within a software application.

As discussed herein, techniques herein are well suited for use in the field of providing improved wireless services to communication devices. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein (BRIEF DESCRIPTION OF EMBODIMENTS) purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section (which is a summary of embodiments) and corresponding figures of the present disclosure as further discussed below.

Figure 1:
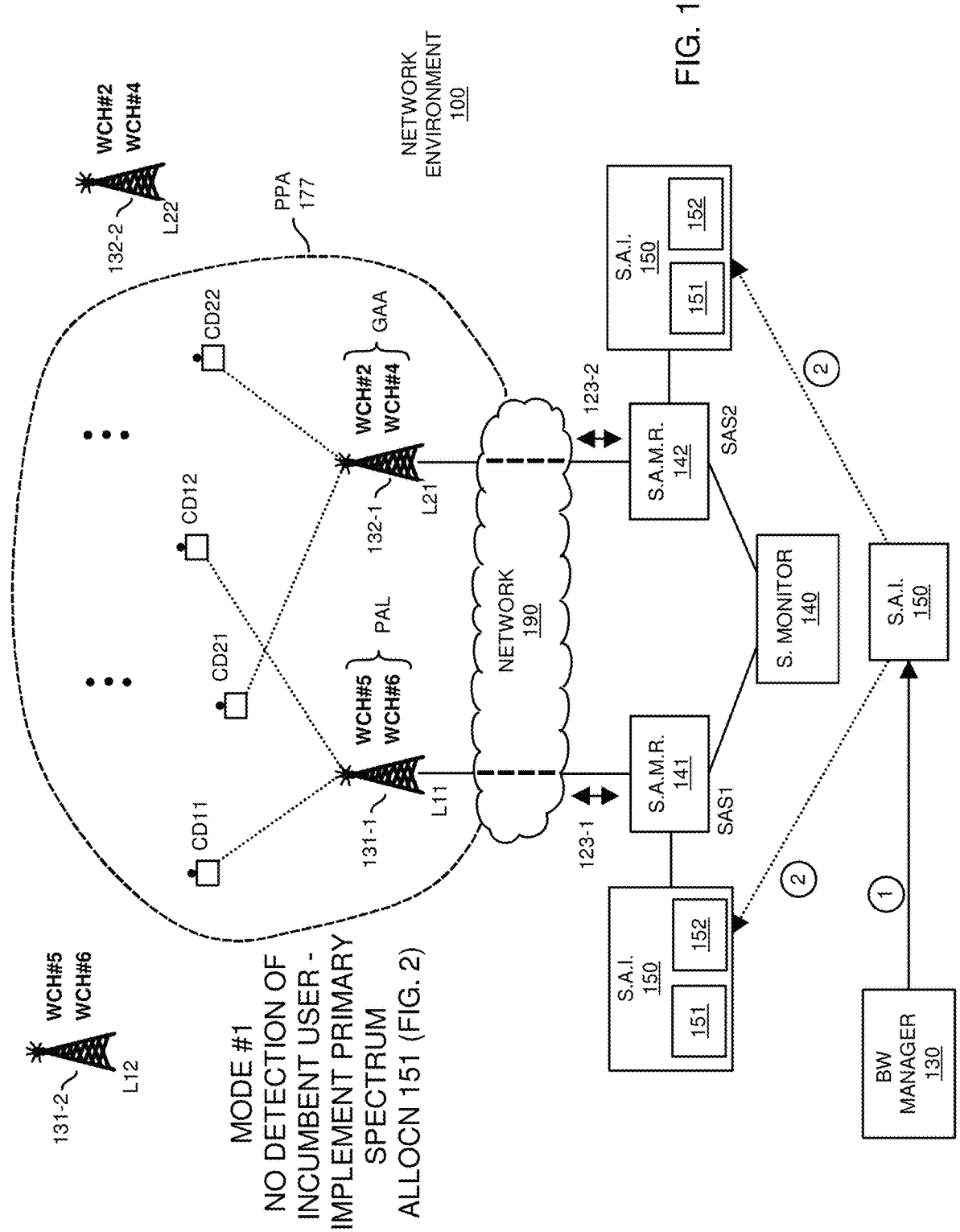
FIG. 1 is an example diagram illustrating a wireless network environment implementing hierarchical wireless spectrum allocation according to embodiments herein.

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION

Priority Access License (PAL) holders purchase wireless licenses and reserve the right to use them in corresponding pre-determined geographical areas of operation. If there are PAL operators in a CBRS network, the main purpose of SAS (Spectrum Access System) is to protect these PAL holders (licensed wireless network service providers) from the interference generated by other users in the network.

According to one embodiment, multiple users in a tiered hierarchy share use of a wireless spectrum. A spectrum access system receives a notification indicating that a first-priority tier 1 user (incumbent user) temporarily needs access to a first wireless spectrum assigned to a second-priority tier 2 user (PAL user). In response to the notification, the spectrum access system temporarily allocates the second-priority tier 2 user (PAL user) use of a second wireless spectrum as a substitute to the first wireless spectrum. The spectrum access system protects use of the second wireless spectrum by the second-priority tier 2 user from a third-priority tier 3 user (GAA user). In certain instances, multiple spectrum access systems receive the same notification of use of the first wireless spectrum by the first-priority tier 1 user. The multiple spectrum access systems not serving the second-priority tier 2 user protect the Tier 2 User from any Tier 3 Users.

As further discussed herein, from an implementation perspective, allocation management hardware (such as centrally located as one spectrum access system or disparately located as multiple spectrum access systems) receives notification of primary wireless spectrum allocation information and backup wireless spectrum allocation information. Initially, the allocation management hardware implements the primary spectrum allocation information via allocation of first wireless spectrum to a first wireless station (such as a second-priority tier 2 user or a first wireless network service provider) and second wireless spectrum to a second wireless station (such as a third-priority tier 3 user or a second wireless network service provider) in a network environment. In response to detecting a trigger event in which the first wireless spectrum is no longer available for use (such as due to use by a first-priority tier 1 user), the allocation management hardware implements the backup spectrum allocation information as substitute to the first spectrum allocation information. As indicated by the backup allocation information, the communication management hardware allocates use of the second wireless spectrum to the first wireless station (second-priority tier 2 user) as a substitute to the first wireless spectrum during a condition in which a first-priority tier 1 user acquires use of the first wireless spectrum.

Techniques as described herein are advantageous because licensed operators (such as PAL users) are afforded novel protection via backup spectrum allocation information when a portion of licensed wireless channels are unavailable for use.

Now, more specifically, FIG. 1 is an example diagram illustrating a wireless network environment implementing hierarchical spectrum allocation according to embodiments herein.

As shown in this example embodiment, network environment 100 includes spectrum manager 130, spectrum monitor 140, spectrum allocation management resource 141 (such as spectrum access system S1), spectrum allocation management resource 142 (such as spectrum access system S2), wireless stations 131 (namely, wireless station 131-1, wireless station 131-2, . . . ), wireless stations 132 (namely, wireless station 132-1, wireless station 132-2, . . . ), communication devices CD11, CD12, . . . , communication devices CD21, CD22, . . . , and network 190 (such as including the Internet, wireless infrastructure, etc.).

Each communication device is mobile or stationary with respect to a wireless station providing it access to network 190.

As further shown, wireless station 131-1 (such as operated by a first wireless network service provider) is disposed at location L11 providing communication devices CD11, CD12, etc., access to network 190; wireless station 131-2 is disposed at location L12, and so on.

Wireless station 132-1 (such as operated by a second wireless network service provider) is disposed at location L21 providing communication devices CD21, CD22, etc., access to network 190; wireless station 132-2 is disposed at location L22, and so on.

In one embodiment, the wireless base station 131-1 operates in a so-called PPA 177 (PAL Protection Area) in which the spectrum allocation management resource 141, spectrum allocation management resource 142, etc., protect use of the PAL users and corresponding use of allocated licensed wireless channels. As further discussed herein, protection includes reducing a likelihood that any PAL users (licensed users) in the PPA 177 experience wireless interference from other wireless stations (non-licensed users).

In this example embodiment, in the network environment 100 and PPA 176, an incumbent user (first-priority tier 1 user) has highest priority rights to use respective wireless channels. If the spectrum monitor 140 detects use of one or more wireless channels by higher priority users, the spectrum monitor 140 notifies the spectrum allocation management resources 141 and 142 of this condition. The spectrum allocation management resources 141 and 142, in turn, notify (such as immediately or within a short timeframe such as a few minutes) the wireless stations (and corresponding wireless network service providers) to discontinue use of such wireless channels.

In one embodiment, each of the spectrum allocation management resources individually or collectively keep track of a respective location of each of the wireless stations and allocate wireless channels such that two or more wireless stations implementing wireless communications do not interfere with each other. For example, in one embodiment, the spectrum allocation management resources allocate different wireless channels to wireless stations that are in the same location or geographical region to prevent occurrence of wireless interference.

Note that each of the resources (such as wireless stations, communication devices, spectrum allocation management resources, spectrum monitor, spectrum manager, etc.) in network environment 100 can be configured to include appropriate hardware, software, or combination of hardware and software to carry out respective operations as discussed herein.

For example, spectrum manager 130 can be configured as spectrum manager hardware, spectrum manager software, or a combination of spectrum manager hardware and spectrum manager software; spectrum monitor 140 can be configured as spectrum monitor hardware, spectrum monitor software, or a combination of spectrum monitor hardware and spectrum monitor software; spectrum allocation management resource 141 can be configured as spectrum allocation management hardware, spectrum allocation management software, or a combination of spectrum allocation management hardware and spectrum allocation management software; spectrum allocation management resource 142 can be configured as spectrum allocation management hardware, spectrum allocation management software, or a combination of spectrum allocation management hardware and spectrum allocation management software; wireless station 131-1 can be configured as wireless station hardware, wireless station software, or a combination of wireless station hardware and wireless station software; wireless station 132-1 can be configured as wireless station hardware, wireless station software, or a combination of wireless station hardware and wireless station software; and so on.

During further operation, the spectrum manager 130 produces spectrum allocation information 150 indicating allocation of spectrum to each of the wireless stations in network environment 100.

In this example embodiment, the spectrum manager 130 distributes the spectrum allocation information 150 to each of one or more spectrum allocation management resource 141 (such as SAS1) and spectrum allocation management resource 142 (such as SAS2).

For example, the spectrum manager 130 or other suitable entity distributes the spectrum allocation information 150 (predetermined wireless channel allocation information) including primary spectrum allocation information 151 and the backup spectrum allocation information 152 to multiple instances of spectrum allocation management resources such as including spectrum allocation management resource 141 (such as a first spectrum access system providing spectrum allocation to a first wireless network service provider operating the wireless station 131-1, 131-2, etc.) and spectrum allocation management resource 142 (such as a second spectrum access system providing spectrum allocation to a second wireless network service provider operating the wireless stations 132-1, 132-2, etc.). As previously discussed, the spectrum allocation management resource 141 and spectrum allocation management resource 142 can be a single entity.

In one embodiment, the spectrum allocation management resources periodically communicate with each other to synchronize use of wireless channels so that the respective users do not interference with each other.

Note further that the spectrum allocation management resources (such as communication management hardware, software, etc., receiving the spectrum allocation information 150) as discussed herein can be implemented in any suitable manner. For example, in one embodiment, the spectrum allocation management resource 141 and the second spectrum allocation management resource 142 can be disparately located with respect to each other. Alternatively, the spectrum allocation management resources can be combined into a single spectrum allocation management resource (such as a single SAS resource) disposed at a central location to control operation of wireless channels to wireless stations operated by different wireless network service providers.

The different wireless network service providers subscribe to wireless channel (such as wireless spectrum, bandwidth, wireless channels, etc.) allocation services provided by the spectrum allocation management resources. For example, certain users (i.e., wireless network service providers such as PAL users) pay a fee for a license to use wireless spectrum.

As discussed herein, coordination and implementation of the spectrum allocation information 150 (such as primary spectrum allocation information 151 and backup spectrum allocation information 152) to wireless stations operated by multiple wireless network service providers (such as PAL users and GAA users) ensures fair use of corresponding available spectrum (wireless channels #1-10).

In this example embodiment, the incumbent user is a first-priority tier 1 user in the priority hierarchy, the PAL users are second-priority tier 2 users in the priority hierarchy, and the GAA users are third-priority tier 3 users in the priority hierarchy. In the hierarchy, the incumbent users have highest priority access rights; the PAL users have second highest priority access rights; the GAA users have the lowest priority access rights.

The wireless stations in network environment 100 can be operated by any number of multiple different service providers. For example, in one embodiment, the first wireless stations 131-1, 131-2, etc., are operated by a first wireless network service provider (second-priority tier 2 user or PAL user); the first wireless network service provider has a license (such as via paying a license fee) to use the first wireless spectrum.

The second wireless stations 132-1, 132-2, etc., are operated by a second wireless network service provider (third-priority tier 3 user or GAA user); the second wireless network service provider being a non-licensed user of the second spectrum.

Licensed users (wireless network service providers and corresponding wireless stations) are assigned a higher priority to use wireless channels 1-10 (in the licensed wireless channel band) than non-licensed users.

In still further example embodiments, the note that the one or more allocation management resource (such as 141, 142, etc.) can be configured to notify one or more second second-priority tier 2 users (such as wireless station 131-1, 131-2, etc.) in the wireless system about temporary spectrum assignments (such as primary allocation information 151 and backup allocation information 152) in advance of implementing a reallocation of wireless spectrum. In one embodiment, the second-priority tier 2 users configure their user equipment (such as wireless stations) for appropriate bandwidth parts to use for switching between the primary and temporary spectrum assignments.

Figure 2:
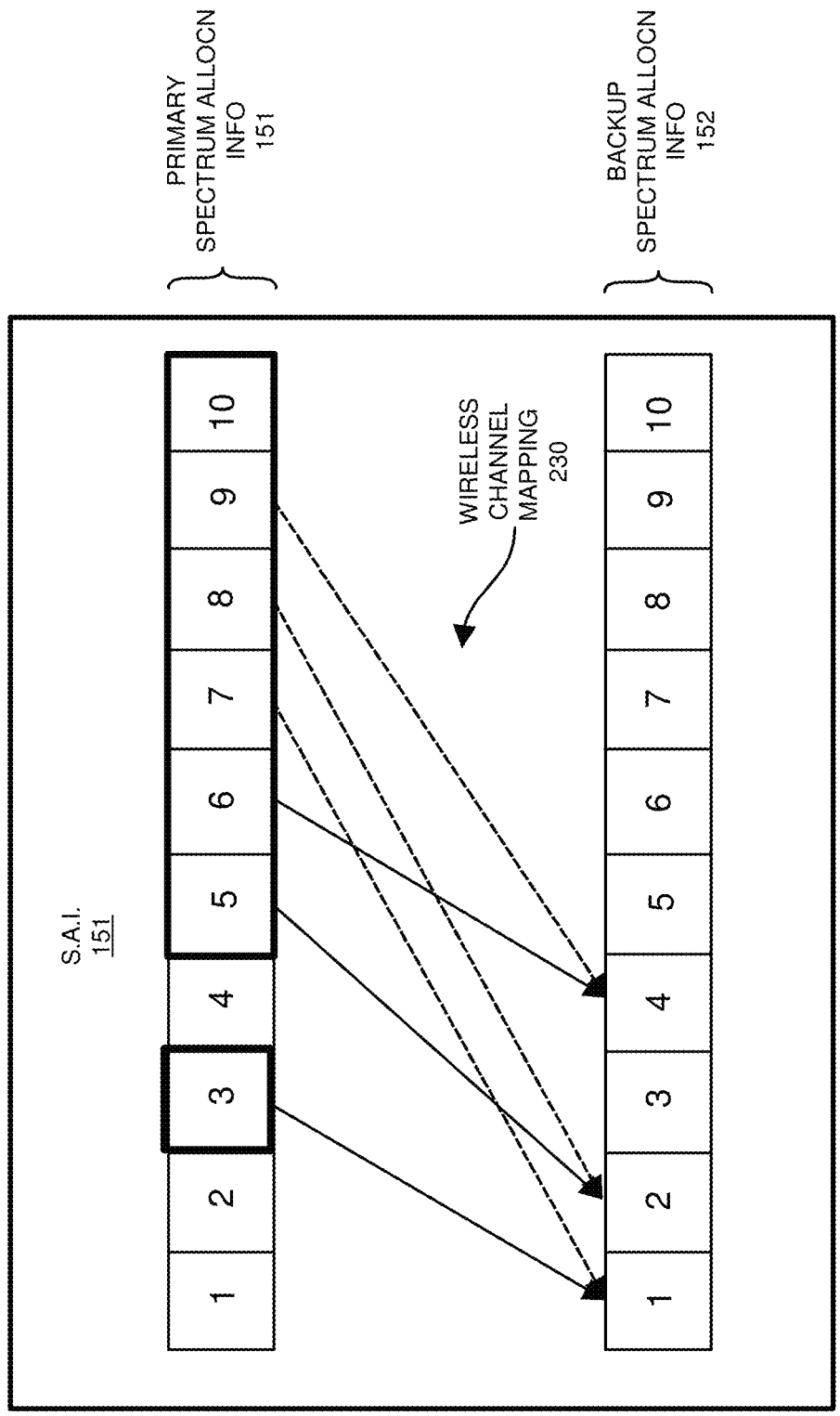
FIG. 2 is an example diagram illustrating primary channel allocation information and backup channel allocation information according to embodiments herein.

As further shown in FIG. 2, even though wireless channels 1-10 are allocated/reserved for use by licensed entities, different portions of the licensed spectrum of wireless channels 1-10 are allocated for use by different PAL (licensed wireless network service providers) and GAA users (unlicensed wireless network service providers) depending on which of the wireless channels 1-10 are available for use in the spectrum hierarchy.

FIG. 2 is an example diagram illustrating primary channel allocation information and backup channel allocation information according to embodiments herein.

In this example embodiment, the spectrum allocation information 150 includes primary spectrum allocation information 151 and backup spectrum allocation information 152.

The first spectrum allocation information 151 is implemented during conditions in which none of the wireless channels 1-10 are used by an incumbent user. The backup spectrum allocation information 152 is implemented during conditions in which one or more of the wireless channels 1-10 are unavailable due to use of respective wireless channels by an incumbent user (i.e., higher priority user).

The wireless spectrum as discussed herein includes any number of one or more wireless channels.

For example, assume in this example embodiment that the first spectrum allocated to the wireless station 131-1 includes wireless channel #5 and wireless channel #6 assigned for use by the first wireless station 131-1 during the first condition of all wireless channels #1-10 being available for use by PAL and GAA users. The primary spectrum allocation information 151 also includes a second wireless spectrum such as wireless channels #2 and #4 assigned for use by the second wireless station 132-1 during the first condition of all wireless channels #1-10 being available for use by PAL and GAA users.

In one embodiment, the wireless channels #1, #2, and #4 represent spectrum allocated to GAA users in the primary spectrum allocation information 151; the wireless channels #3 and #5-10 represent spectrum allocated to PAL users in the primary spectrum allocation information 151 during the first condition.

Thus, even though the wireless channels #1-10 represent licensed wireless channels, only wireless channel #7 out of the ten wireless channels are allocated for use by licensed wireless network service providers.

As previously discussed, the spectrum allocation information 150 also includes backup spectrum allocation information 152 for implementation during a second condition when not all of the wireless channels #1-10 are available for users.

For example, in accordance with a first backup assignment associated with a first group of wireless channels #3, #5, and #6: i) wireless channel #1 is a backup allocation for wireless channel #3 in the event that wireless channel #3 is not available for use; ii) wireless channel #2 is a backup allocation for wireless channel #5 in the event that wireless channel #5 is not available for use; iii) wireless channel #4 is a backup allocation for wireless channel #6 in the event that wireless channel #6 is not available for use.

Additionally, in accordance with a second backup assignment associated with a second group of wireless channels #7, #8, and #9: i) wireless channel #1 is a backup allocation for wireless channel #7 in the event that wireless channel #7 is not available for use; ii) wireless channel #2 is a backup allocation for wireless channel #8 in the event that wireless channel #8 is not available for use; iii) wireless channel #4 is a backup allocation for wireless channel #9 in the event that wireless channel #9 is not available for use.

In one embodiment, the spectrum manager 130 chooses which of the wireless channels to include in the first group and the second group based on the likelihood of the wireless channels being reallocated for use during incumbent use.

For example, in this example embodiment, the wireless channels in the first group include wireless channels #3, #5, and #6 which are identified as typically being allocated together; the wireless channels in the second group include wireless channels #7, #8, and #9 which are identified as typically being allocated together. Such groupings and backup wireless channel assignments reduce a likelihood that both wireless channels #3 and #7 will need to be reallocated to wireless channel #1 during a backup condition. Thus, embodiments herein include implementing temporary spectrum assignments for second-priority tier 2 users, which are mapped via at least one multiple-to-1 mappings (wireless channels 3 and 7 map to wireless channel 1, wireless channels 5 and 8 map to wireless channel 2, wireless channels 6 and 9 map to wireless channel 4).

In still further example embodiments, the wireless channels #1-10 are ten of sixteen wireless channels available from a tiered wireless channel hierarchy (such as a CBRS band further discussed in FIG. 8 and corresponding text) in which a first wireless network service provider operating the first wireless stations 131-1, 131-2, etc., has higher priority access rights to use of the wireless spectrum channels #1-10 than a second wireless network service provider operating the second wireless stations 132-1, 132-2, etc.

In other words, as discussed herein, because the wireless channels are allocated from a tiered channel hierarchy, one or more of the wireless channels #1, #2, and #4 are deallocated from an unlicensed wireless network service provider (GAA, non-licensed user) and re-allocated to a licensed wireless network service provider (PAL, licensed user) during backup conditions.

In still further example embodiments, as implementation of the backup spectrum allocation information 152 provides spectrum usage protection to the first wireless network service provider granted a license to use all or a portion of the wireless channels #1-10. In other words, if a portion of the first wireless spectrum becomes unavailable for use by the first wireless stations 131-1, 131-2, etc., operated by the first wireless network service provider, the first wireless stations (and corresponding first wireless network service provider) are allocated use of the second wireless spectrum from the wireless channels #1-10.

Referring again to FIG. 1, as previously discussed, via the spectrum manager 130, the spectrum allocation management resource 141 (such as communication management hardware, communication management software, or combination of both) receives notification of primary spectrum allocation information 151 and backup spectrum allocation information 152. Thus, in one embodiment, the temporary spectrum assignments as specified by the backup spectrum usage (backup spectrum allocation 152) for second-priority tier 2 users and third-priority tier 3 users are pre-determined and are consistent across all spectrum access systems (such as SAS1, SAS2, etc.) providing allocation service in a service area.

Spectrum allocation management resource 142 (such as communication management hardware, communication management software, or combination of both) also receives notification of primary spectrum allocation information 151 and backup spectrum allocation information 152.

Each of the spectrum allocation management resources 141 and 142 control use of the wireless channels #1-10 in accordance with the spectrum allocation information 150 depending on the current operating conditions of network environment 100.

For example, in one embodiment, the spectrum monitor 140 (such as an ESC or Environmental Sensing Capability) monitors use of the available wireless channels 1-10 by higher priority users. The spectrum monitor 140 is or includes a network of sensors used to detect federal frequency use in the 3550-3650 MHz band (or other suitable band) in protection zones where military radar systems can operate.

In FIG. 1, assume that the spectrum monitor 140 does not detect use by a higher priority user (e.g., incumbent, government user, etc.).

As shown, via communication 123-1, the wireless station 131-1 (such as operated by a second-priority tier 2 wireless network service provider) registers with the spectrum allocation management resource 141. Subsequent to registration, the wireless station 131-1 communicates with the spectrum allocation management resource 141 for allocation of spectrum (such as one or more wireless channels). In this example embodiment, as indicated by the spectrum allocation information 151, the spectrum allocation management resource 141 allocates wireless station 131-1 use of wireless channels #5 and #6.

As shown, via communication 123-2, the wireless station 132-1 (such as operated by a third-priority tier 3 wireless network service provider) registers with the spectrum allocation management resource 142. Subsequent to registration, the wireless station 132-1 communicates with the spectrum allocation management resource 142 for allocation of spectrum (such as one or more wireless channels). In this example embodiment, as indicated by the spectrum allocation information 151, the spectrum allocation management resource 142 allocates wireless station 132-1 use of wireless channels #2 and #4.

Thus, initially, during the first mode when all wireless channels #1-10 are available, the spectrum allocation management resource 141 implements usage of wireless channels #1-10 in accordance with the primary spectrum allocation information 151 via allocation of first wireless spectrum (such as wireless channel #5 and wireless channel #6) to first wireless station 131-1 and second wireless spectrum (such as wireless channel #2 and wireless channel #4) to a second wireless station 132-1 in a network environment 100.

Figure 3:
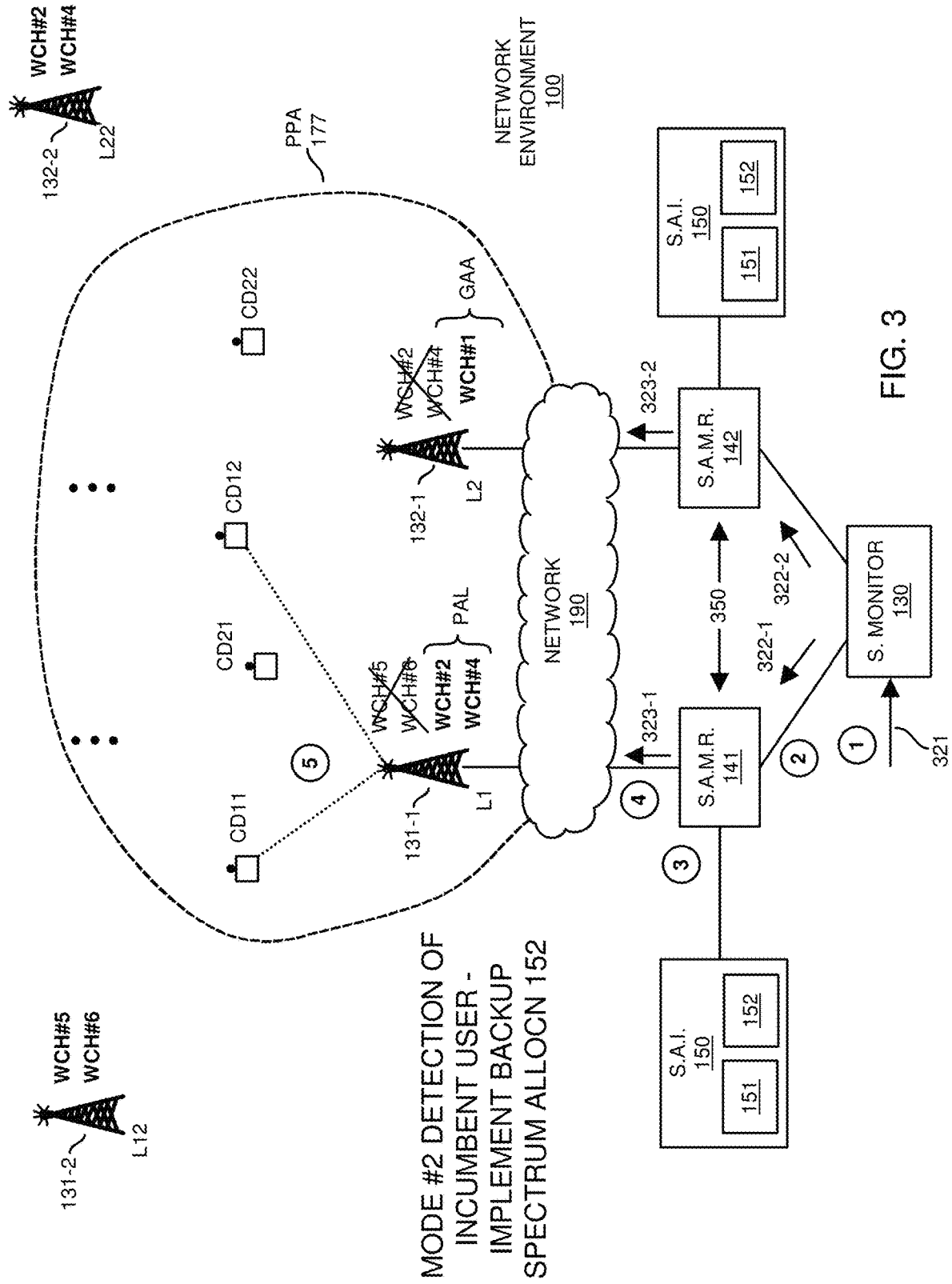
FIG. 3 is an example diagram illustrating detection of a trigger event and implementation of backup wireless spectrum allocation information according to embodiments herein.

FIG. 3 is an example diagram illustrating detection of a trigger event and implementation of backup spectrum allocation information according to embodiments herein.

As further shown in FIG. 3, via input 321, the spectrum monitor 130 detects a trigger event such as use of wireless channel #5 and #6 by a respective incumbent user. More specifically, in one embodiment, the trigger event is notification indicating use of the first wireless spectrum (such as wireless channels 5 and 6) by a spectrum user (first-priority tier 1 user) having higher priority rights than the first wireless network service provider (second-priority tier 2 user) operating the first wireless station.

In such an instance, the spectrum monitor 130 transmits communications 322-1 and 322-2 to the spectrum allocation management resources 141 and 142. The communications 322 (indicating the need of use by the incumbent user to use the wireless channel 5 and 6) causes the spectrum allocation management resources 141 and 142 to implement the backup spectrum allocation information in the PPA 177 so that the wireless network service provider operating the wireless base station 131-1 is provided protection and continued allocation of wireless spectrum.

For example, in response to detecting the trigger event as indicated by the communications 322, and determining that both the first wireless station 131-1 and the second wireless station 132-1 are in a same geographical region (subject to wireless interference with respect to each other in a PPA 177), the spectrum allocation management resources implement the backup spectrum allocation information 152 in the PPA 177.

In one embodiment, because the wireless base station 131-2 and wireless base station 132-2 reside outside the PPA 177, there is no need to adjust use of such wireless channels allocated to them.

More specifically, in accordance with the backup spectrum allocation information 152, in response to receiving communication 322-2, the spectrum allocation management resource 142 notifies (via communications 323-2) the second wireless station 132-1 (and corresponding third-priority tier 3 wireless network service provider or GAA user) to discontinue use of the second wireless spectrum (wireless channel #2 and #4) to transmit wireless communications in the network environment 100 to communication devices CD21, CD22, etc. In one embodiment, the spectrum allocation management resource 142 allocates use of wireless channel #1 or other wireless channel by the wireless base station 132-1.

Additionally, in accordance with the backup spectrum allocation information 152, in response to receiving communication 322-1, the spectrum allocation management resource 141 notifies (via communications 323-1) the first wireless station 132-1 to discontinue use of the first wireless spectrum (wireless channel #5 and #6) and to use second wireless spectrum (wireless channel #2 and #4) to transmit wireless communications in the network environment 100 to communication devices CD11, CD12, etc.

In accordance with further example embodiments, in response to receiving notification that a first-priority tier 1 user (incumbent user) temporarily needs access to spectrum (wireless channels 5 and 6) assigned to a second-priority tier 2 user in PPA 177, the spectrum allocation management resources re-assign only the second-priority tier 2 users (such as at least including the wireless network service provider operating the wireless base station 131-1) in the PPA 177 affected by the first-priority tier 1 user temporarily to other wireless spectrum (such as wireless channels 2 and 4) to protect the second-priority tier 2 user from third-priority tier 3 users (such as GAA user operating the wireless base station 132-1, wireless base station 132-2, etc.).

In accordance with further example embodiments, if the spectrum allocation management resource 141 or spectrum allocation management resource 142 is unaware of a backup allocation event such as due to not receiving communications 322 from the spectrum monitor 130, the respective spectrum allocation management resource may continue use of the wireless channels as usual without protecting a PAL protection area in the assigned backup PAL channels until a next CPAS (Coordinated Periodic Activities among SASs) cycle supporting communications 350.

In one embodiment, CPAS communications (such as communications 350) represent a daily or periodic process in which all spectrum allocation management resources in network environment 100 synchronize allocation of wireless channels to ensure protection of incumbent entities. For example, the spectrum allocation management resources avoid allocating use of a particular wireless channel if it is unavailable due to use by an incumbent entity.

Thus, if the spectrum allocation management resources do not immediately receive notification of an incumbent user via communications 322, the spectrum allocation management resource will learn of such use via communications 350 and implement backup wireless channel usage.

In this example embodiment, it is noted that the spectrum allocation management resource 142 can be one or more multiple spectrum allocation management resources (spectrum access systems) that do not serve (allocate wireless channels to) the wireless base station 131-1. In one embodiment, in response to receiving notification at the spectrum allocation management resource 142 that a first-priority tier 1 user temporarily needs access to spectrum assigned to a second-priority tier 2 user (such as wireless network service provider operating the wireless base station 131-1) who is not served by the spectrum access system 142, the spectrum allocation management resource 142 provides protection to the second-priority tier 2 user operating wireless base station 131-1 in accordance with pre-determined temporary spectrum assignments (backup spectral allocation information 152) implemented by the multiple spectrum access systems as discussed herein.

Figure 4:
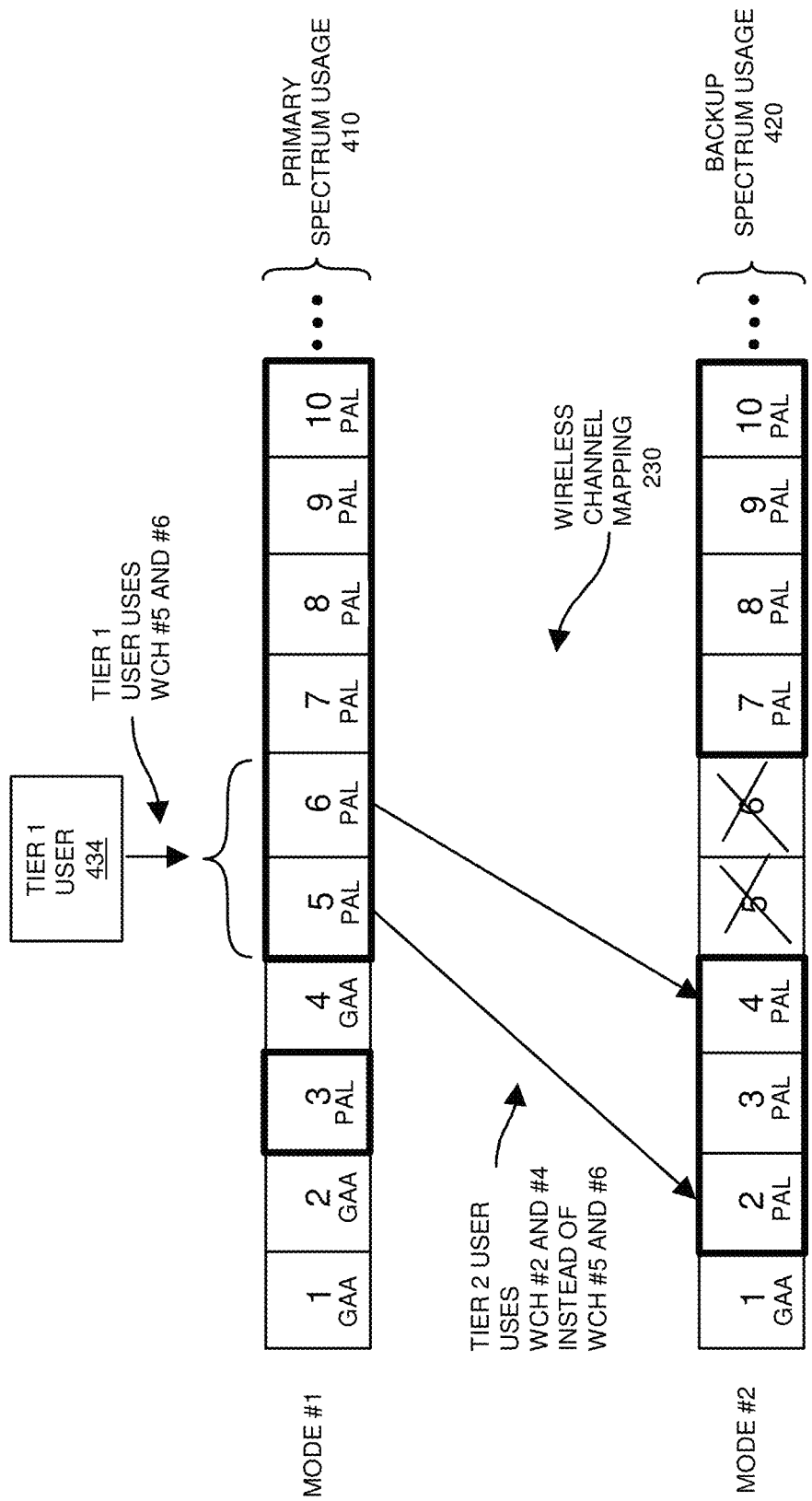
FIG. 4 is an example diagram illustrating switchover from a primary spectrum allocation to a backup wireless spectrum allocation according to embodiments herein.

FIG. 4 is an example diagram illustrating switchover from implementation of primary spectrum allocation to implementation of backup spectrum allocation according to embodiments herein.

For example, as previously discussed, in response to detecting the trigger event (incumbent use) in which wireless channels #5 and #6 (first wireless spectrum) are no longer available for allocation because the first-priority tier 1 user temporarily needs use of the first wireless spectrum, and determining that the first wireless station 131-1 and the second wireless station 132-1 are in a PPA 177 or same geographical region: i) the spectrum allocation management resource 142 notifies the second wireless station 132-1 to discontinue use of the wireless channels #2 and #4 to transmit communications in the network environment; and ii) the spectrum allocation management resource 141 notifies the first wireless station 131-1 to discontinue use of the wireless channels #5 and 6 and instead use wireless channels #2 and 4 to transmit wireless communications in the network environment.

Thus, in response to the notification of the first-priority tier 1 user using the wireless channels 5 and 6, the spectrum allocation management resource 141 temporarily allocates the second-priority tier 2 user operating wireless base station 131-1 use of a second wireless spectrum (wireless channels 2 and 4). In one embodiment, deallocation of the wireless channels 2 and 4 from the wireless base station 132-1 protects use of the second wireless spectrum (wireless channels 2 and 4) by the second-priority tier 2 user wireless base station 131-1 from a third-priority tier 3 user (such as GAA user operating the wireless base station 132-1.

Thus, in mode #1 (FIG. 1) via implementation of the primary spectrum usage 410, seven out of the ten available licensed wireless channels 1-10 are used by (or allocated to) PAL users while 3 are used by (or allocated to) GAA users.

After switchover to mode #2 (FIG. 3) via implementation of the backup spectrum usage 420, wireless channels 5 and 6 are used by the incumbent user; seven (wireless channels 2-4 and 7-10) out of the eight available wireless channels (1-4 and 7-10) are used by (or allocated to) PAL users, while one wireless channel (#1) is used by (or allocated to) a GAA user.

Thus, in mode #2, in response to receiving notification that the first-priority tier 1 user temporarily needs access to the first wireless spectrum (wireless channels 5 and 6) assigned to the second-priority tier 2 user, the allocation management resources temporarily allocate third spectrum (such as wireless channel #1) to the third-priority tier 3 user operating wireless base station 132-1. In one embodiment, the third spectrum (such as wireless channel 1) is unassigned spectrum.

In accordance with further example embodiments, in one embodiment, in response to receiving the notification of use of wireless channels 5 and 6 by the incumbent user and non-availability of unassigned spectrum for the second priority tier-2 user, the spectrum allocation management resources: i) deallocate the second spectrum (wireless channels 5 and 6) from the third-priority tier 3 user operating the wireless base station 132-1, ii) allocate the second spectrum wireless channels 2 and 4 to the second-priority tier 2 user operating the wireless base station 131-1, and iii) allocate a third spectrum such as wireless channel #1 to the third-priority tier 3 user operating the wireless base station 132-1. In such an instance, in response to receiving the notification of the incumbent user using the wireless channels 5 and 6 and non-availability of unassigned spectrum for the third-priority tier 3 user, embodiments herein include modifying a spectrum grant for the third-priority tier 3 user.

As further discussed below, in response to receiving notification that the first-priority tier 1 user no longer requires use of the first wireless spectrum such as including wireless channels 5 and 6, the spectrum allocation management resources allocate the first wireless spectrum (wireless channels 5 and 6) to the second-priority tier 2 user operating wireless base station 131-1.

Figure 5:
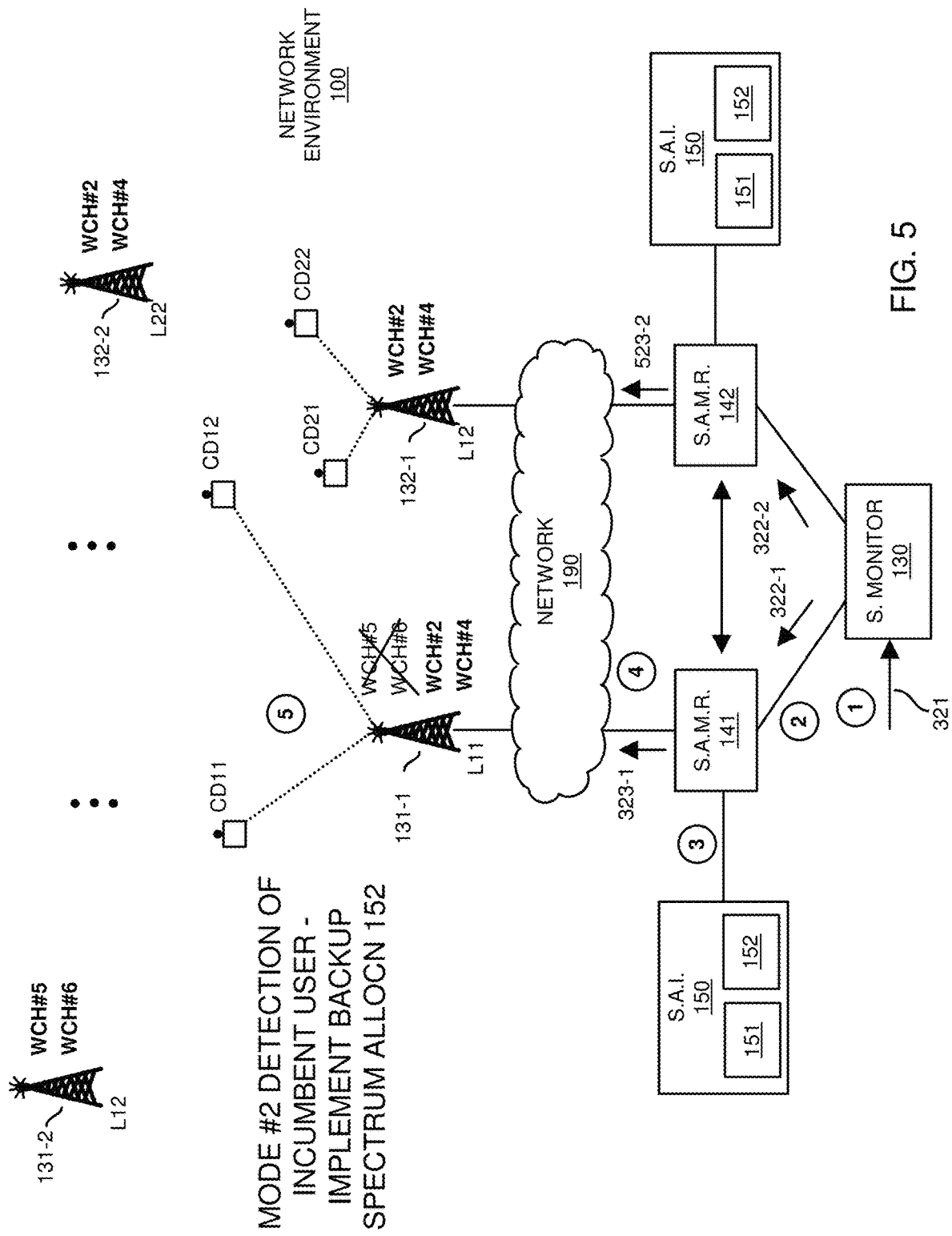
FIG. 5 is an example diagram illustrating detection of a trigger event and implementation of backup wireless spectrum allocation according to embodiments herein.

FIG. 5 is an example diagram illustrating detection of a trigger event and implementation of backup spectrum allocation according to embodiments herein.

In certain instances, it is not required that the second wireless base station 132-1 discontinue use of the second wireless spectrum (wireless channel 2 and 4) during the backup mode (mode #2).

For example, in one embodiment, in response to detecting the trigger event such as use of the wireless channels #5 and #6 by the higher priority entity, the spectrum allocation management resource 142 can be configured to notify (via communications 523-2) the second wireless station 132-1 to reduce a wireless output power level of transmitting communications from the second wireless station 132-1 over the second wireless spectrum (wireless channels #2 and #4).

Reducing the respective wireless output power level of communicating with the second wireless spectrum over (wireless channels #2 and #4) reduces or eliminates interference associated with use of the second wireless spectrum (wireless channels #2 and #4) by the first wireless station 131-1 now assigned these wireless channels.

Thus, embodiments herein include, in response to detecting the trigger event of an incumbent user using the wireless channels #5 and #6, the spectrum allocation management resource 142 controls use of the second wireless spectrum (wireless channels #2 and #4) by the second wireless station 132-1 to reduce wireless interference associated with the first wireless station 131-1 using the wireless channels #2 and #4. In other words, the reduced wireless power level (of wireless station 132-1 using wireless channels 2 and 4) enables the wireless station 131-1 to use the wireless channels #2 and #4 with little or no interference from wireless station 132-1 using the same wireless channels #2 and #4.

Thus, in one embodiment, protecting the second-priority tier 2 user operating wireless base station 131-1 from wireless interference as discussed herein includes: reducing a power transmit level of one or more wireless devices (such as wireless base station 132-1, communication device CD21, communication device CD22, etc.) operated by or associated with the third-priority tier 3 users communicating via the second wireless spectrum.

In further example embodiments, in response to receiving notification that the first-priority tier 1 user (incumbent user) temporarily needs access to spectrum (wireless channels 5 and 6) assigned for use to the second-priority tier 2 user in a PPA 177, the spectrum allocation management resources allocate all second-priority tier 2 users in the PAL Protection Area temporarily to other spectrum (such as wireless channels 2 and 4) in the band while protecting the second-priority tier 2 users from interference by any third-priority tier 3 users in the PPA 177.

Figure 6:
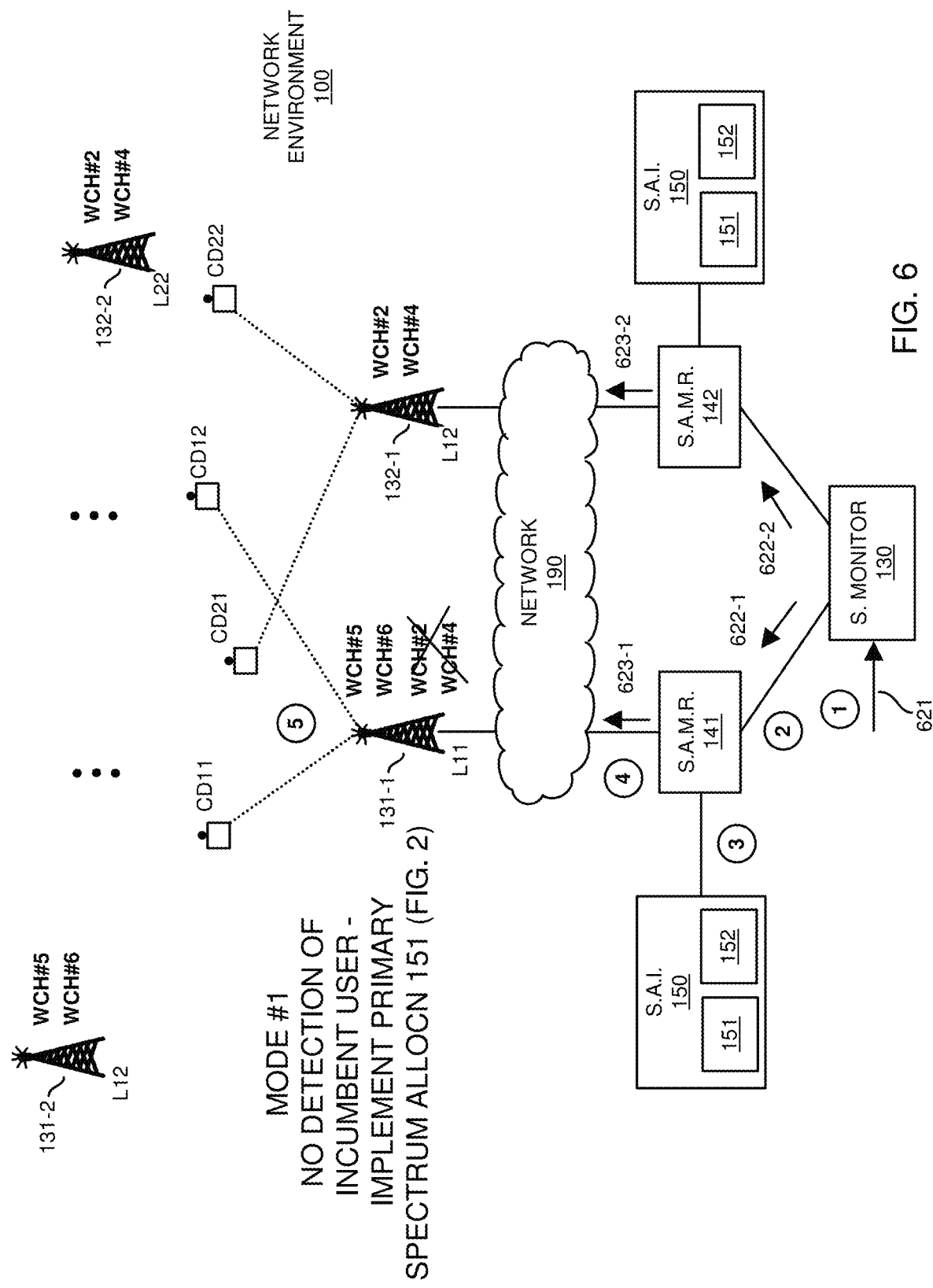
FIG. 6 is an example diagram illustrating a trigger event and implementation of primary wireless spectrum allocation according to embodiments herein.

FIG. 6 is an example diagram illustrating a trigger event and implementation of primary spectrum allocation according to embodiments herein.

As further shown in FIG. 6, via input 621, the spectrum monitor 130 detects a trigger event such as discontinued use of wireless channel #5 and #6 by a respective incumbent user via input 621.

More specifically, in one embodiment, the trigger event is notification indicating discontinued use of the first wireless spectrum (wireless channel #5 and #6) by an incumbent user. In such an instance, the spectrum monitor 130 transmits communications 622-1 and 622-2 to the spectrum allocation management resources 141 and 142. The communications 622-1 and 622-2 notify the spectrum allocation management resources 141 and 142 that wireless channels #5 and #6 are available again for allocation to wireless stations in network environment 100.

In response to receiving respective communications 622-1 and 622-2, the spectrum allocation management resources 141 and 142 then adjust use of the wireless channels again in accordance with the primary spectrum allocation information 151 again instead of backup spectrum allocation information 152.

For example, via communications 623-1, in response to availability of wireless channels 5 and 6 based on the incumbent user no longer using these channels, the spectrum allocation management resource 141 notifies the wireless station 132-1 to discontinue use of wireless channels #2 and 4 and instead use wireless channels #5 and 6 to communicate with communication devices CD11, CD12, etc., in accordance with primary spectrum allocation information 151.

Via communications 623-2, the spectrum allocation management resource 142 notifies the wireless station 132-2 to use wireless channels #2 and 4 and instead use wireless channel #1 to communicate with communication devices CD21, CD22, etc., in accordance with primary spectrum allocation information 151. This condition is further illustrated in FIG. 7.

Thus, embodiments herein include, in response to receiving notification that the first-priority tier 1 user (incumbent user) no longer needs access to the first wireless spectrum (wireless channels 5 and 6): the spectrum allocation management resources 141, 142, etc., restores third-priority tier 3 user spectrum grants that had been cancelled or modified. For example, wireless base station 132-1 is reallocated use of wireless channels 2 and 4.

Note that in further example embodiments, in response to receiving notification that the first-priority tier 1 user (incumbent) no longer needs access to the first wireless spectrum (such as wireless channels 5 and 6), the spectrum allocation management resources allocate the second wireless spectrum (such as wireless channels 2 and 4) to the third-priority tier 3 user operating wireless base station 132-1 or the spectrum allocation management resources provide continued allocation of the third wireless spectrum (wireless channel 1) to the third-priority tier 3 user operating wireless base station 132-1.

Figure 7:
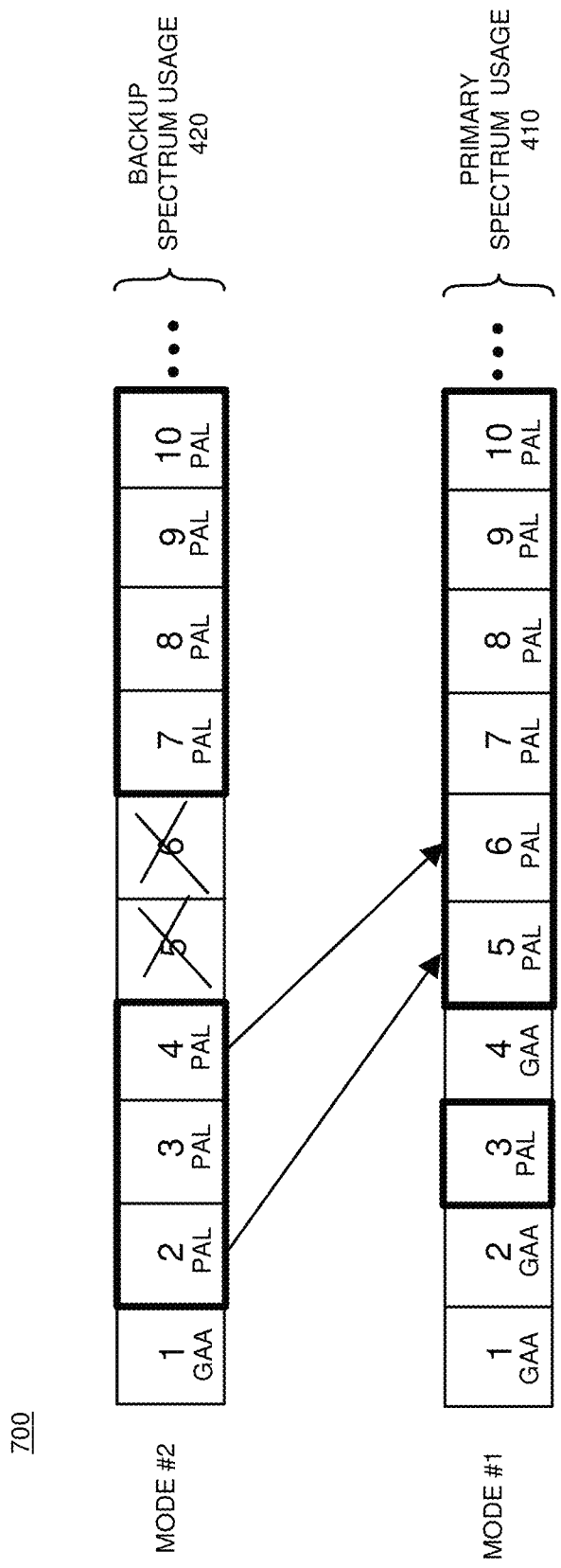
FIG. 7 is an example diagram illustrating switchover from backup wireless channel usage to primary wireless channel usage according to embodiments herein.

FIG. 7 is an example diagram illustrating switchover from the backup wireless channel allocation to the primary wireless channel allocation according to embodiments herein.

For example, graph 700 illustrates switchover of backup spectrum usage 420 to primary spectrum usage 410. In such an instance, the wireless channels #2 and 4 are de-allocated for use by wireless station 131-1 (a PAL user) and re-allocated to wireless station 132-1 (a GAA user) again because wireless channels #5 and 6 are free for use by the wireless station 131-1. Graph 700 further illustrates switchover of the wireless channels #5 and 6 from being allocated for use by an incumbent user to being allocated for use by wireless station 131-1 (a PAL user).

Figure 8:
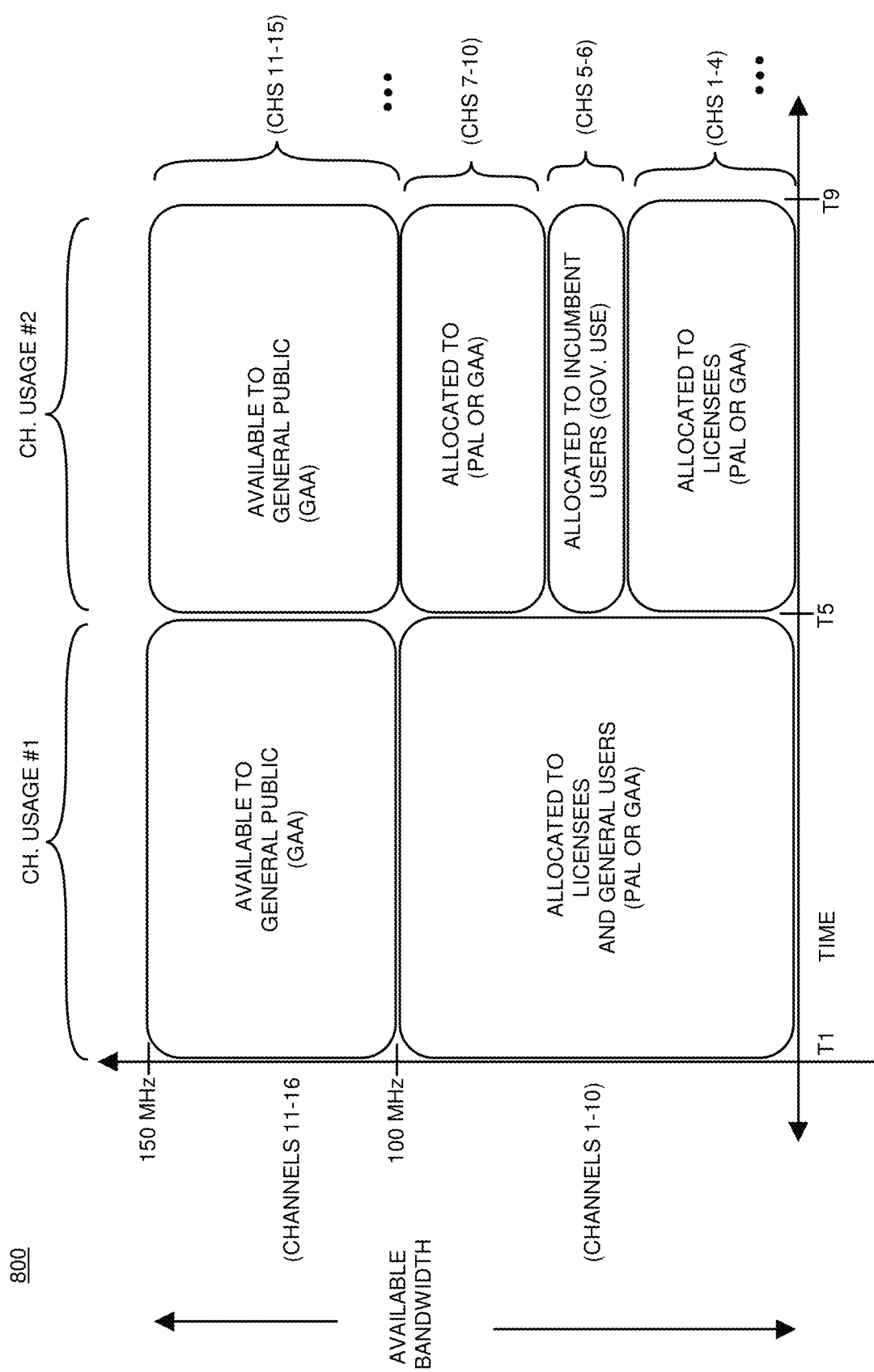
FIG. 8 is an example diagram illustrating allocation of spectrum from a CBRS (Citizen Band Radio Service) according to embodiments herein.

FIG. 8 is an example diagram illustrating generation of dynamic channel allocation information indicating allocation of spectrum at different tiers of a channel hierarchy according to embodiments herein.

As previously discussed, spectrum manager 130 can be configured to allocate any suitable type of wireless spectrum (spectrum, wireless channels, etc.) for use by the communication devices such as wireless base stations in the network environment 100.

In one non-limiting example embodiment, the communication manager 130 allocates spectrum (wireless channels) from a so-called CBRS (Citizens Band Radio System) band operating between 3.550 and 3.700 GHz (GigaHertz) (such as 150 MegaHertz or 15 wireless channels that are each 10 MHz wide).

Also, as previously discussed, the spectrum allocation management resources 141 and 142 (such as spectrum access systems, allocation management resource, or other suitable entity) keeps track, at any given time, which wireless channels or portions of the multi-tier wireless spectrum or multi-tier radio band (such as CBRS band) are available in the geographical region in which the network environment 100 resides. If government use (such as use via a so-called incumbent user) is detected or requested via appropriate input (such as around time T5) to the allocation management resource 140, certain channels (such as those used by the general public) are no longer available for use as shown in the content access information 195-2.

More specifically, in this example, graph 800 indicates that between time T1 and time T5 (such as mode #1 or first condition), there is no indication detection of an incumbent user and thus licensed wireless channels 1-10 are available for use by licensed wireless user (and potentially unlicensed GAA users) for use; channels 11-15 are available for use by unlicensed GAA users. In a manner as previously discussed, these channels are allocated for use by the wireless base stations in network environment 100.

As further shown, at or around time T5, assume that the spectrum monitor 140 detects use of the wireless channels #5 and 6 by an incumbent user having higher priority than the PAL users and GAA users. In such an instance, the spectrum monitor 140 notifies the spectrum allocation management resource 141 and spectrum allocation management resource 142 of such use prompting discontinued use of wireless channels #5 and 6 as well as reallocation of wireless channels #2 and 4 in a manner as previously discussed during conditions in which wireless channels #5 and 6 are unavailable.

Figure 9:
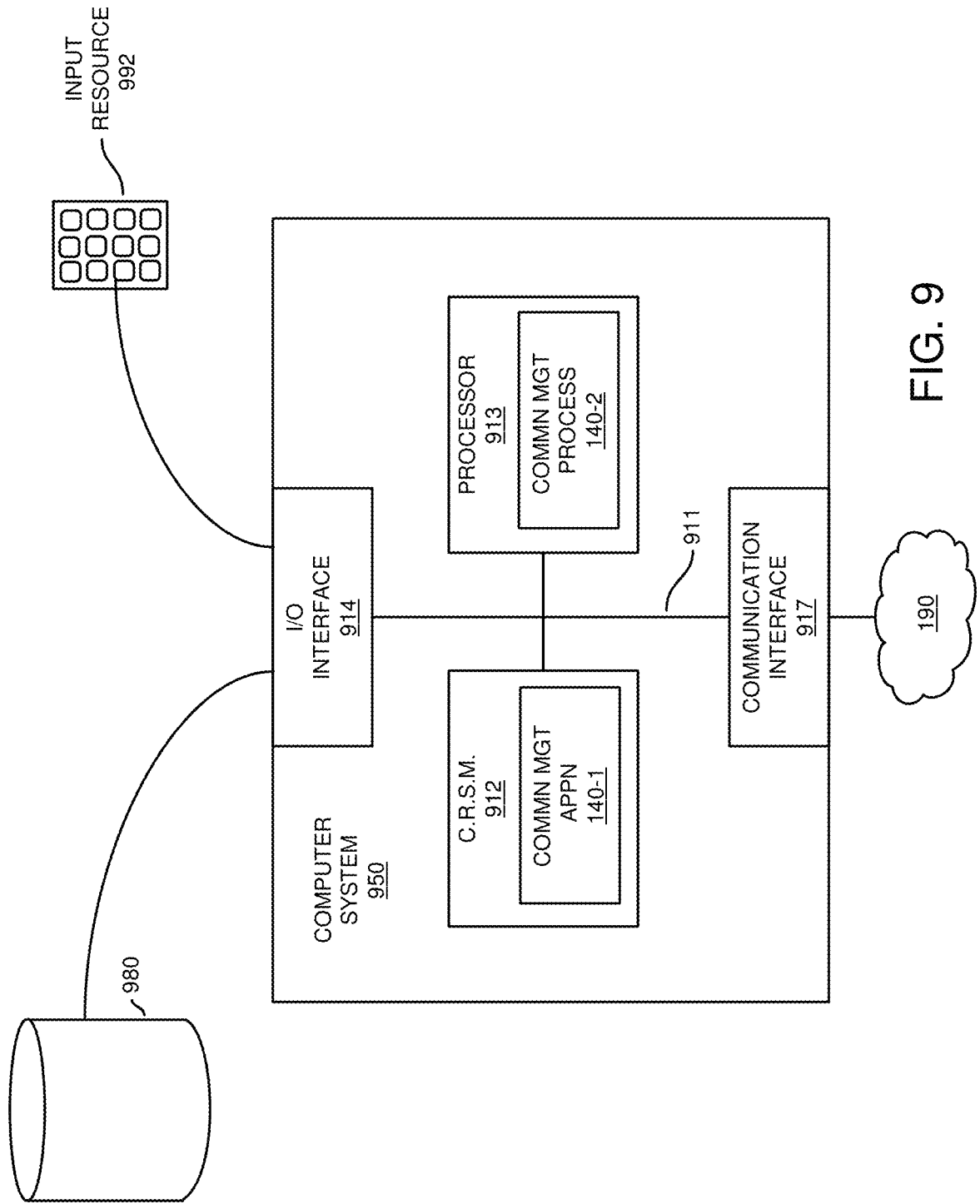
FIG. 9 is a diagram illustrating example computer architecture to execute one or more operations according to embodiments herein.

FIG. 9 is an example block diagram of a computer system for implementing any of the operations as previously discussed according to embodiments herein.

Any of the resources (such as communication management resource, spectrum allocation management resource 141, spectrum allocation management resource 142, spectrum monitor 130, spectrum manager 140, wireless station 131-1, wireless station 132-1, etc.) as discussed herein can be configured to include computer processor hardware and/or corresponding executable instructions to carry out the different operations as discussed herein.

As shown, computer system 950 of the present example includes an interconnect 911 that couples computer readable storage media 912 such as a non-transitory type of media (which can be any suitable type of hardware storage medium in which digital information can be stored and retrieved), a processor 913 (computer processor hardware), I/O interface 914, and a communications interface 917.

I/O interface(s) 914 supports connectivity to repository 980 and input resource 992.

Computer readable storage medium 912 can be any hardware storage device such as memory, optical storage, hard drive, floppy disk, etc. In one embodiment, the computer readable storage medium 912 stores instructions and/or data.

As shown, computer readable storage media 912 can be encoded with communication management application 140-1 (e.g., including instructions) to carry out any of the operations as discussed herein.

During operation of one embodiment, processor 913 accesses computer readable storage media 912 via the use of interconnect 911 in order to launch, run, execute, interpret or otherwise perform the instructions in management application 140-1 stored on computer readable storage medium 912. Execution of the communication management application 140-1 produces communication management process 140-2 to carry out any of the operations and/or processes as discussed herein.

Those skilled in the art will understand that the computer system 950 can include other processes and/or software and hardware components, such as an operating system that controls allocation and use of hardware resources to execute communication management application 140-1.

In accordance with different embodiments, note that computer system may reside in any of various types of devices, including, but not limited to, a mobile computer, a personal computer system, a wireless device, a wireless access point, a base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, set-top box, content management device, handheld remote control device, any type of computing or electronic device, etc. The computer system 950 may reside at any location or can be included in any suitable resource in any network environment to implement functionality as discussed herein.

Functionality supported by the different resources will now be discussed via flowcharts in FIG. 10. Note that the steps in the flowcharts below can be executed in any suitable order.

Figure 10:
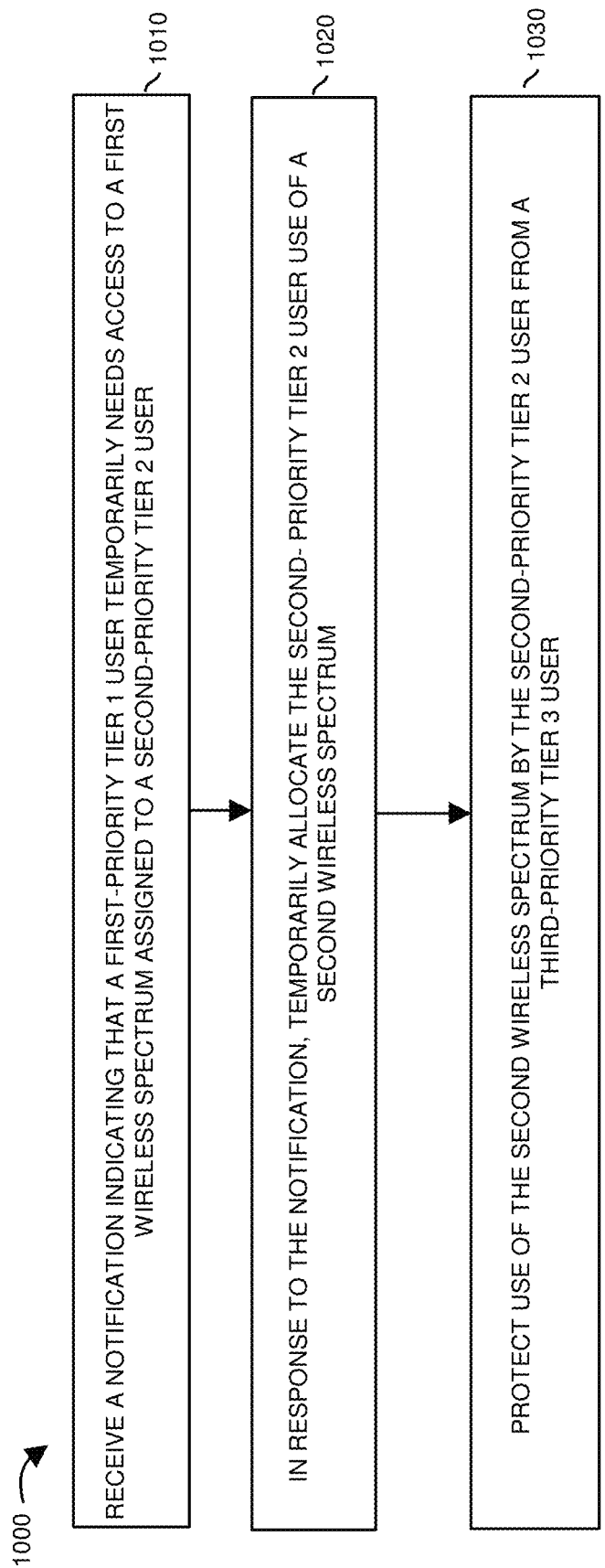
FIG. 10 is an example diagram illustrating a method according to embodiments herein.

FIG. 10 is a flowchart 1000 illustrating an example method according to embodiments. Note that there will be some overlap with respect to concepts as discussed above.

In processing operation 1010, the allocation management resource 140 receives a notification 322-1 indicating that a first-priority tier 1 user (such as incumbent user) temporarily needs access to a first wireless spectrum (such as wireless channel #5 and 6) assigned to a second-priority tier 2 user (such as wireless network service provider operating the wireless base station 131-1).

In processing operation 1020, in response to the notification, the allocation management resource temporarily allocates the second-priority tier 2 user (such as wireless network service provider operating the wireless base station 131-1) use of a second wireless spectrum (such as wireless channels 2 and 4).

In processing operation 1030, the allocation management resource 141 protects the use of the second wireless spectrum (wireless channels 2 and 4) by the second-priority tier 2 user (wireless base station 131-1) from a third-priority tier 3 user. (such as wireless network service provider operating one or more wireless base station 132-1, 132-2, etc.).

Figure 11:
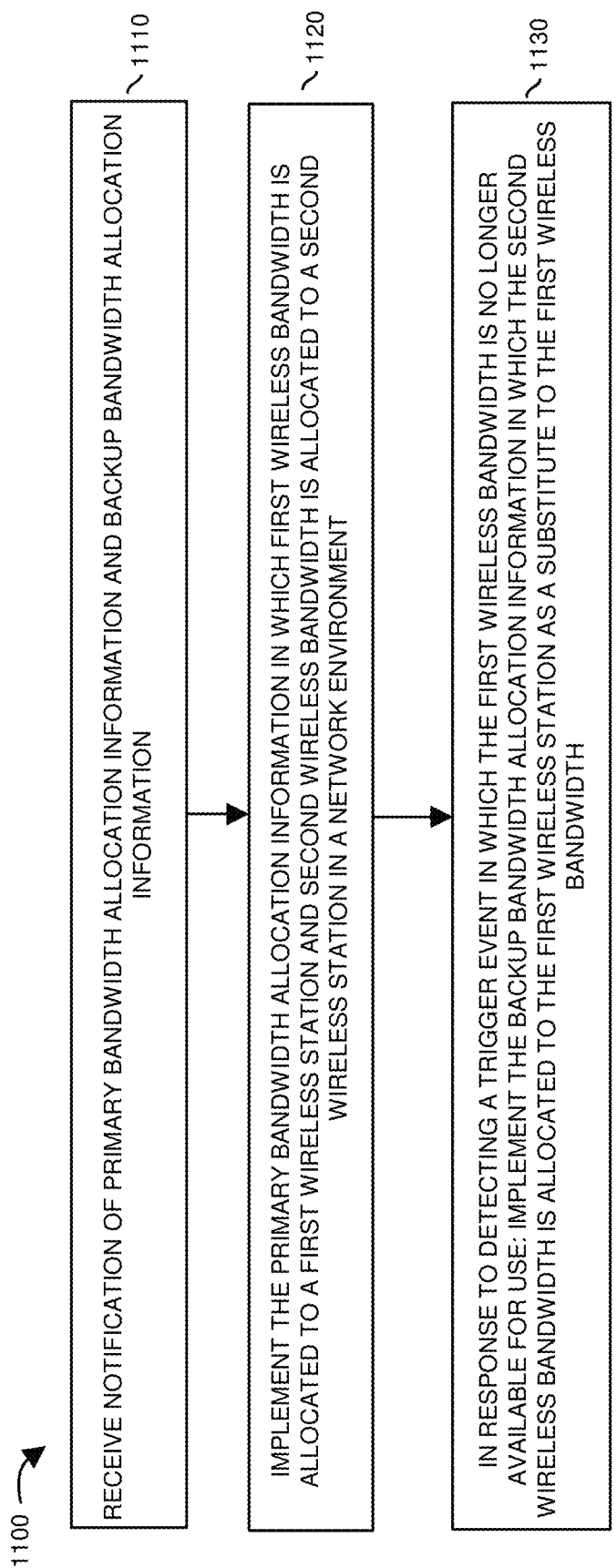
FIG. 11 is an example diagram illustrating a method according to embodiments herein.

FIG. 11 is a flowchart 1100 illustrating an example method according to embodiments. Note that there will be some overlap with respect to concepts as discussed above.

In processing operation 1110, the communication management resource 140 (such as spectrum allocation management resource 141 and/or spectrum allocation management resource 142) receives notification of primary spectrum allocation information 151 and backup spectrum allocation information 152.

In processing operation 1120, the communication management resource 140 implements the primary spectrum allocation information 151 in which first wireless spectrum (such as wireless channels #5 and #6) is allocated to a first wireless station 131-1 and second wireless spectrum (such as wireless channels #2 and #4) is allocated to a second wireless station 132-1 in a network environment 100.

In processing operation 1130, in response to detecting a trigger event in which the first wireless spectrum is no longer available for use: the communication management resource implements the backup spectrum allocation information 152 in which the second wireless spectrum (such as wireless channels #2 and #4) is reallocated to the first wireless station 131-1 as a substitute to the first wireless spectrum (such as wireless channels #5 and #6).

Further Embodiments

In accordance with further example embodiments, several wireless network service providers are awarded PAL licenses on a per county basis in the lower 10 CBRS channels.

A grant of PAL licenses to an wireless network service provider operator affords the operator protection from co-channel interference generated by lower-tier GAA users in a respective PAL Protection Area (PPA).

The PAL licensee is required to protect higher tier (incumbent users) at all times. In a situation where incumbent radar activity is detected (e.g. a US naval aircraft carrier approaching US shoreline) in a Dynamic Protection Area (DPA), any operating PAL licensees operating in channel(s) used by the radar, must vacate use of the one or more wireless channels. A DPA activation event is one in which use of wireless channels is detect by an incumbent entity; a DPA deactivation event is one in which use of wireless channels is no longer detected by an incumbent entity.

Based on the knowledge of all CBSD locations and granted powers in a DPA, the SAS computes a list of channel grants for each of the first 10 channels in the CBRS band which would have to be suspended if the DPA becomes activated. It is called the move or backup allocation list. A DPA may impact 1 or 2 PAL channels temporarily.

In further example embodiments, the SAS may facilitate PAL CBSDs on the move list to find alternate channels in the CBRS band to continue operations. However, there is no mechanism defined in the standards to protect PAL from co-channel GAA operation in the event of a move. Without protection as discussed herein, PAL users may face increased wireless interference or wireless outage.

The methods described herein allow SAS to offer protection to PAL users during DPA activation. For each county, SAS maps each of the assigned PAL channels (such as X wireless channels, where $X \leq 7$) to secondary PAL channels not assigned (10-X) in the county in the lower 10 channels of the CBRS band.

The backup mapping may be Many-to-1 depending on the number of channels assigned and not assigned in a given county. In one embodiment, the SAS avoids mapping channels that are known or expected to be activated together at the same time in a DPA (e.g. adjacent channels) to the same channel.

SAS determines corresponding secondary PPAs for the CBSDs.

The secondary (backup) PAL channel mapping and the corresponding secondary PPAs are shared among all SASs during CPAS (Coordinated Periodic Activities among SASs) a.k.a., IAP. In one embodiment, CPAS communications represent a daily process in which all SASs synchronize to ensure protection of incumbents. SASs may avoid mapping a particular channel if it is unavailable.

SASs may also determine a tertiary mapping to the upper 5 CBRS channels in case there is a conflict when multiple DPAs get activated. No PPA protection is offered in these channels.

When a DPA is activated, a SAS relocates the affected PAL CBSDs to secondary PAL channels according to the mapping.

When a DPA is activated, all SASs (aware of DPA activation) recognize that the affected PAL channels will be relocated according to the shared mapping and that the corresponding PPAs would need to be protected. Based on this realization, SASs may need to take one or more of the following steps: i) suspending grants for GAA operations on the assigned secondary PAL channels, and ii) potentially change grants for PAL operations in neighboring counties on the assigned secondary PAL channels if the operations interfere with the relocated PPAs. This may involve lowering EIRP (Effective Isotropic Radiated Power) for the wireless channel grants.

When the previously activated DPA is de-activated, SAS moves back the relocated PAL CBSDs to the primary PAL channel assignments. All SASs (aware of DPA de-activation) protect the corresponding PPAs. Moreover, any PAL grants in neighboring counties that were changed due to DPA activation are restored. If a SAS is unaware of a DPA activation event (due to not having contact with an ESC indicating the detected use of non-use of wireless channels), it may continue as usual without protecting PPAs in the assigned secondary PAL channels until the next CPAS cycle.

Note again that techniques herein are well suited to facilitate protection of licensed users (wireless network service providers) in a hierarchical wireless spectrum allocation system. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While this invention has been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

We claim:

1. A method comprising:
receiving notification of primary spectrum allocation information and backup spectrum allocation information;
implementing the primary spectrum allocation information in which first wireless spectrum as specified by the primary spectrum allocation information is allocated to a first wireless station and second wireless spectrum as specified by the backup spectrum allocation information is allocated to a second wireless station in a network environment; and
in response to detecting a trigger event in which the first wireless spectrum is no longer available for use: implementing the backup spectrum allocation information in which the second wireless spectrum is allocated to the first wireless station as a substitute to the first wireless spectrum.

2. The method as in claim 1 further comprising:
in response to detecting the trigger event and detecting that the first wireless station and the second wireless station are in a same geographical region, notifying the second wireless station to discontinue use of the second wireless spectrum to wirelessly transmit communications in the network environment.

3. The method as in claim 1 further comprising:
in response to detecting the trigger event, notifying the second wireless station to reduce a wireless output power level of transmitting communications from the second wireless station over the second wireless spectrum.

4. The method as in claim 1 further comprising:
in response to detecting the trigger event, controlling use of the second wireless spectrum by the second wireless station to reduce wireless interference.

5. The method as in claim 1, wherein the first wireless station is operated by a first wireless network service provider;
wherein the second wireless station is operated by a second wireless network service provider; and
wherein the trigger event is notification of use of the first wireless spectrum by an incumbent entity having higher priority rights than the first wireless network service provider operating the first wireless station.

6. The method as in claim 5, wherein the first wireless network service provider has higher priority rights than the second wireless network service provider.

7. The method as in claim 1, wherein the first wireless station is operated by a first wireless network service provider, the first wireless network service provider having a license to use the first wireless spectrum; and
wherein the second wireless station is operated by a second wireless network service provider, the second wireless network service provider being a non-licensed user of the second wireless spectrum.

8. The method as in claim 1, wherein the first wireless spectrum includes a first wireless channel and a second wireless channel allocated for use by the first wireless station; and
wherein the second wireless spectrum includes a third wireless channel and a fourth wireless channel allocated for use by the first wireless station as backup wireless channels, the third wireless channel being a backup to the first wireless channel, the fourth wireless channel being a backup to the second wireless channel.

9. The method as in claim 1, wherein the backup spectrum allocation information provides spectrum usage protection to a wireless network service provider granted a license to use the first wireless spectrum.

10. The method as in claim 1, wherein the second wireless spectrum as specified by the backup spectrum allocation information is a backup wireless channel for multiple wireless channels in the first spectrum allocation information.

11. The method as in claim 1, wherein the primary spectrum allocation information and the secondary spectrum allocation information are distributed amongst multiple spectrum allocation management resources in a network environment managing operation of the first wireless station and the second wireless station.

12. The method as in claim 1, wherein the first wireless spectrum is a first licensed wireless channel allocated from a tiered channel hierarchy in which a first wireless network service provider operating the first wireless station is a licensed operator having a higher access priority to the second wireless spectrum than a non-licensed second wireless network service provider operating the second wireless station.

13. The method as in claim 1, wherein implementing the backup spectrum allocation information in response to the trigger event includes:
transmitting first communications from first spectrum allocation management hardware to the first wireless station, the first spectrum allocation management hardware controlling operation of the first wireless station, the first communications notifying the first wireless station to use the second wireless spectrum to wirelessly communicate from the first wireless station; and
transmitting second communications from second spectrum allocation management hardware to the second wireless station, the second spectrum allocation management hardware controlling operation of the second wireless station, the second communications notifying the second wireless station to adjust usage of the second wireless spectrum to wirelessly transmit messages.

14. The method as in claim 1, wherein the first wireless spectrum includes a first wireless channel allocated for use by the first wireless station; and
wherein the second wireless spectrum includes a second wireless channel allocated for use by the first wireless station as a backup wireless channel with respect to the first wireless channel.

15. The method as in claim 14, wherein implementing the backup spectrum allocation information includes revocation of use of the second wireless channel by the second wireless station during a condition in which an incumbent entity uses the first wireless channel.

16. The method as in claim 15 further comprising:
in response to detecting discontinued use of the first wireless channel by the incumbent entity: i) notifying the first wireless station to use the first wireless channel, and ii) notifying the second wireless station to use the second wireless channel.

17. The method as in claim 15, wherein the first wireless channel and the second wireless channel are not contiguous with respect to each other.

18. The method as in claim 1, wherein implementing the backup spectrum allocation information in response to the trigger event includes:
transmitting first communications from spectrum allocation management hardware to the first wireless station, the spectrum allocation management hardware controlling operation of the first wireless station, the first communications notifying the first wireless station to use the second wireless spectrum to wirelessly communicate from the first wireless station; and
transmitting second communications from the spectrum allocation hardware to the second wireless station, the spectrum allocation management hardware controlling operation of the second wireless station, the second communications notifying the second wireless station to discontinue use of the second wireless spectrum to wirelessly transmit messages.

19. The method as in claim 1, wherein the first wireless spectrum is a first wireless channel allocated from a tiered channel hierarchy; and
wherein the second wireless spectrum is a second wireless channel allocated from the tiered channel hierarchy.

20. The method as in claim 1, wherein the first wireless spectrum includes a first wireless channel and a second wireless channel allocated for use by the first wireless station; and
wherein the second wireless spectrum includes a third wireless channel allocated for use by the first wireless station as a backup wireless channel, the third wireless channel being a backup to the first wireless channel.

21. The method as in claim 1, wherein the first wireless spectrum is a first wireless channel; and
wherein the second wireless spectrum is a second wireless channel.

22. The method as in claim 1, wherein implementing the backup spectrum allocation information in response to detecting the trigger event includes:
notifying the first wireless station to use the second wireless spectrum instead of the first wireless spectrum.

23. The method as in claim 22, wherein implementing the backup spectrum allocation information in response to detecting the trigger event includes:
notifying the second wireless station to discontinue use of the second wireless spectrum.

24. A system comprising:
communication management hardware operable to:
receive notification of primary spectrum allocation information and backup spectrum allocation information;
implement the primary spectrum allocation information in which first wireless spectrum as specified by the primary spectrum allocation information is allocated to a first wireless station and second wireless spectrum as specified by the backup spectrum allocation information is allocated to a second wireless station in a network environment; and
in response to detecting a trigger event in which the first wireless spectrum is no longer available for use: implement the backup spectrum allocation information in which the second wireless spectrum is allocated to the first wireless station as a substitute to the first wireless spectrum.

25. The system as in claim 24, wherein the communication management hardware is further operative to:
in response to detecting the trigger event and detecting that the first wireless station and the second wireless station are in a same geographical region, notify the second wireless station to discontinue use of the second wireless spectrum to transmit communications in the network environment.

26. The system as in claim 24, wherein the communication management hardware is further operative to:
in response to detecting the trigger event, notify the second wireless station to reduce a wireless output power level of transmitting communications from the second wireless station over the second wireless spectrum.

27. The system as in claim 24, wherein the communication management hardware is further operative to:
in response to detecting the trigger event, control use of the second wireless spectrum by the second wireless station to reduce wireless interference.

28. The system as in claim 24, wherein the first wireless station is operated by a first wireless network service provider;
wherein the second wireless station is operated by a second wireless network service provider; and
wherein the trigger event is notification of use of the first wireless spectrum by an incumbent entity having higher priority rights than the first wireless network service provider operating the first wireless station.

29. The system as in claim 28, wherein the first wireless network service provider has higher priority rights than the second wireless network service provider.

30. The system as in claim 24, wherein the first wireless station is operated by a first wireless network service provider, the first wireless network service provider having a license to use the first wireless spectrum; and
wherein the second wireless station is operated by a second wireless network service provider, the second wireless network service provider being a non-licensed user of the second spectrum.

31. The system as in claim 24, wherein the first spectrum includes a first wireless channel and a second wireless channel allocated for use by the first wireless station; and
wherein the second wireless spectrum includes a third wireless channel and a fourth wireless channel allocated for use by the first wireless station as backup wireless channels, the third wireless channel being a backup to the first wireless channel, the fourth wireless channel being a backup to the second wireless channel.

32. The system as in claim 24, wherein the backup spectrum allocation information provides spectrum usage protection to a wireless network service provider granted a license to use the first wireless spectrum.

33. The system as in claim 24, wherein the second wireless spectrum as specified by the backup spectrum allocation information is a backup wireless channel for multiple wireless channels in the first spectrum allocation information.

34. The system as in claim 24, wherein the primary spectrum allocation information and the secondary spectrum allocation information are distributed amongst multiple spectrum allocation management resources in a network environment, the multiple spectrum allocation management resources operative to manage the first wireless station and the second wireless station.

35. The system as in claim 24, wherein the first wireless spectrum is a first licensed wireless channel allocated from a tiered channel hierarchy in which a first wireless network service provider operating the first wireless station has a higher access priority to the second wireless spectrum than a second wireless network service provider operating the second wireless station.

36. The system as in claim 24, wherein the communication management hardware is further operative to:
transmit first communications from first spectrum allocation management hardware to the first wireless station, the first spectrum allocation management hardware controlling operation of the first wireless station, the first communications notifying the first wireless station to use the second wireless spectrum to wirelessly communicate from the first wireless station; and
transmit second communications from second spectrum allocation management hardware to the second wireless station, the second spectrum allocation management hardware controlling operation of the second wireless station, the second communications notifying the second wireless station to adjust usage of the second wireless spectrum to wirelessly transmit messages.

37. Computer-readable storage hardware having instructions stored thereon, the instructions, when carried out by computer processor hardware, cause the computer processor hardware to:
receive notification of primary spectrum allocation information and backup spectrum allocation information;
implement the primary spectrum allocation information in which first wireless spectrum as specified by the primary spectrum allocation information is allocated to a first wireless station and second wireless spectrum as specified by the backup spectrum allocation information is allocated to a second wireless station in a network environment; and
in response to detecting a trigger event in which the first wireless spectrum is no longer available for use: implement the backup spectrum allocation information in which the second wireless spectrum is allocated to the first wireless station as a substitute to the first wireless spectrum.

* * * * *